(12) United States Patent
Hammad et al.

(10) Patent No.: US 10,713,685 B2
(45) Date of Patent: *Jul. 14, 2020

(54) MOBILE LOCATION NOTIFICATIONS SYSTEM AND METHOD

(71) Applicant: VISA INTERNATIONAL SERVICE ASSOCIATION, San Francisco, CA (US)

(72) Inventors: Ayman Hammad, Pleasanton, CA (US); Prakash Prem Hariramani, San Francisco, CA (US)

(73) Assignee: Visa International Service Association, San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/024,499

(22) Filed: Jun. 29, 2018

(65) Prior Publication Data

US 2018/0357674 A1 Dec. 13, 2018

Related U.S. Application Data

(63) Continuation of application No. 15/213,225, filed on Jul. 18, 2016, now Pat. No. 10,074,106, which is a
(Continued)

(51) Int. Cl.
*G06Q 30/00* (2012.01)
*G06Q 30/02* (2012.01)
(Continued)

(52) U.S. Cl.
CPC ....... *G06Q 30/0261* (2013.01); *G06Q 20/405* (2013.01); *G06Q 30/0267* (2013.01); *G06Q 30/0269* (2013.01); *G06Q 30/0639* (2013.01)

(58) Field of Classification Search
CPC .................................................. G06Q 30/06–08
(Continued)

(56) References Cited

U.S. PATENT DOCUMENTS 7,305,350 B1   12/2007   Bruecken
7,831,246 B1   11/2010   Smith et al.
(Continued)

FOREIGN PATENT DOCUMENTS

JP          2003122991 A    4/2003

OTHER PUBLICATIONS

"Bankons Launches Mobile Merchant Offer Platform Linking Bank Transaction History to Geodata," PRNewswire, May 10, 2011, 2 pages, [online], [retrieved on Oct. 29, 2012]. Retrieved from the Internet <URL: http://www.prnewswire.com/news-releases/bankons-launches-mobile-merchant-offer-platform-linking-bank-transaction-history-to-geodata-121569273.html>.

*Primary Examiner* — Ethan D Civan
(74) *Attorney, Agent, or Firm* — Kilpatrick Townsend & Stockton LLP

(57) ABSTRACT

Embodiments of the invention are directed to systems, apparatuses, and methods for determining the location of a mobile merchant, and performing further processing based on the determined location. Transaction data for a transaction conducted by a mobile merchant is electronically received at a server computer. The server computer determines a location of the mobile merchant based on the transaction data, and performs further processing based on the location of the mobile merchant.

21 Claims, 12 Drawing Sheets

Related U.S. Application Data continuation of application No. 13/615,199, filed on Sep. 13, 2012, now Pat. No. 9,424,603.

(60) Provisional application No. 61/533,942, filed on Sep. 13, 2011.

(51) Int. Cl.
*G06Q 30/06* (2012.01)
*G06Q 20/40* (2012.01)

(58) Field of Classification Search
USPC .............................................. 705/26.1–27.2
See application file for complete search history.

(56) References Cited

U.S. PATENT DOCUMENTS

| | | |
|---|---|---|
| 7,853,521 B2 | 12/2010 | Williams |
| 9,424,603 B2 * | 8/2016 | Hammad ........... G06Q 30/0639 |
| 2007/0288310 A1 | 12/2007 | Boos et al. |
| 2008/0154706 A1 * | 6/2008 | Bruecken ............... G06Q 10/08 |
| | | 705/14.58 |
| 2008/0177662 A1 | 7/2008 | Smith et al. |
| 2009/0328052 A1 | 12/2009 | Nguyen |
| 2010/0268618 A1 | 10/2010 | McQuilken |
| 2010/0287250 A1 | 11/2010 | Carlson et al. |
| 2011/0010234 A1 | 1/2011 | Lindelsee et al. |
| 2011/0055045 A1 * | 3/2011 | Smith ................ G06O 30/0621 |
| | | 705/26.5 |
| 2011/0093326 A1 | 4/2011 | Bous et al. |
| 2011/0184741 A1 | 7/2011 | Lin et al. |
| 2011/0191184 A1 | 8/2011 | Blackhurst et al. |
| 2013/0144772 A1 | 6/2013 | Huang |

* cited by examiner

MOBILE LOCATION NOTIFICATIONS SYSTEM AND METHOD

CROSS-REFERENCES TO RELATED APPLICATIONS

This application is a continuation application of U.S. patent application Ser. No. 15/213,225, filed on Jul. 18, 2016, which is a continuation application of U.S. patent application Ser. No. 13/615,199 filed Sep. 13, 2012, which claims the benefit of U.S. Provisional Application No. 61/533,942, filed Sep. 13, 2011," which is herein incorporated by reference in its entirety for all purposes.

BACKGROUND

Mobile merchants are an increasingly prevalent phenomenon. Many traditional stationary merchants (e.g., restaurants, grocery stores, department stores, and the like) are opting to sell goods and services at locations other than their usual place of business. For example, some restaurant owners now operate food trucks in addition to their stationary dining venues. Food trucks are often more cost-effective than restaurants, and the ability to reach customers in numerous locations can provide owners with substantial financial benefit.

Mobile merchants typically "set up shop" at different locations on a day-to-day basis. Consequently, awareness by potential customers of a mobile merchant's location can be an important factor in driving sales. Thus, a mobile merchant may desire a mechanism for notifying consumers of the merchant's location in real-time. Further, mobile merchants may want to provide instantaneous and dynamic coupons to potential customers. Such coupons may further increase sales revenue. In the case of mobile merchants that deal in perishable goods, instantaneous coupons may help reduce the amount of unsold goods that must be discarded at the end of the day.

Moreover, in some circumstances, entities other than consumers may want to be aware of a mobile merchant's location. For example, a stationary merchant (e.g., a restaurant) may want to be notified if a mobile merchant (e.g., a food truck) is conducting transactions nearby. In response to such a notification, the restaurant can take remedial measures to prevent losing sales to the food truck. As another example, a mobile merchant that deals in one type of good (e.g., food) and another mobile merchant that deals in a complimentary type of good (e.g., beverages) may want to be made aware of each other's location so that the merchants can collaborate by setting up shop at the same location.

Embodiments of the invention address the above problems, and other problems, individually and collectively.

SUMMARY

Embodiments of the invention are directed to systems, apparatuses, and methods for determining the location of a mobile merchant, and performing further processing based on the determined location.

One embodiment of the invention is directed to a method performed by a server computer, the method comprising electronically receiving transaction data for a transaction conducted by a mobile merchant. The server computer determines a location of the mobile merchant based on the transaction data, and performs further processing based on the location of the mobile merchant.

Another embodiment of the invention is directed to a server computer comprising a processor and a computer readable medium coupled to the processor. The computer readable medium comprises code executable by a processor for implementing a method comprising electronically receiving transaction data for a transaction conducted by a mobile merchant. A location of the mobile merchant is determined based on the transaction data, and further processing is performed based on the location of the mobile merchant.

Another embodiment of the invention is directed to a method performed by an access device associated with a mobile merchant, the method comprising electronically transmitting transaction data for a transaction conducted by the mobile merchant to a server computer associated with a payment processing network. The server computer determines a location of the mobile merchant based on the transaction data, and performs further processing based on the location of the mobile merchant.

In embodiments of the invention, the further processing may comprise, for example, determining a location of a client device, generating a notification including the location of the mobile merchant, and electronically transmitting the notification to the client device. In various embodiments, the client device may be associated with a consumer, a stationary merchant, or another mobile merchant. In some embodiments, the further processing may comprise determining that the distance between the location of the mobile merchant and the location of the client device is within a threshold value.

These and other embodiments of the invention are described in further detail below with reference to the Figures and the Detailed Description.

DETAILED DESCRIPTION

Figure 1:
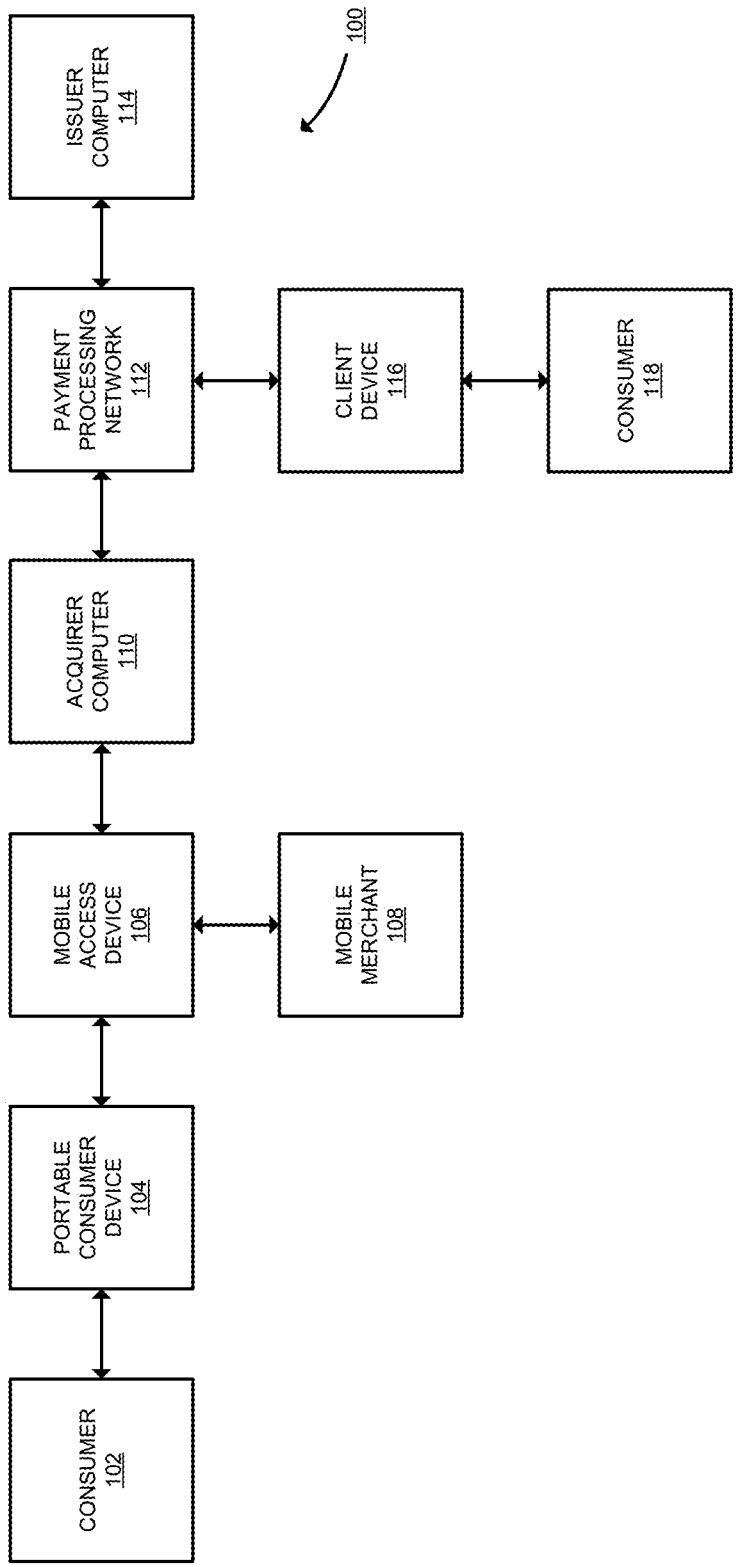
FIG. 1 shows a block diagram of a payment processing and notification system according to an embodiment of the invention.

Prior to discussing embodiments of the invention, a further description of some terms may be helpful in understanding embodiments of the invention.

As used herein, a "mobile merchant" may include an entity that can sell goods and/or services, and that can engage in transactions at different locations. For example, exemplary mobile merchants can include mobile food service providers (e.g., food trucks, food delivery services, etc.), door-to-door salesmen, flea market vendors, home service providers (e.g., electricians, carpenters, floor installers, plumbers, gardeners, housekeepers, handymen, etc.), transportation service providers (e.g., taxis, limousines, tow trucks), and the like.

As used herein, a "stationary merchant" may include an entity that can sell goods and/or services, and that generally engages in transactions at a stationary location. For example, exemplary stationary merchants can include restaurants, cafes, supermarkets, pharmacies, big box stores, boutiques, and the like.

As used herein, a "transaction" may include an exchange or transfer of goods, services, and/or funds. For example, a transaction may be an exchange between a consumer and a mobile merchant involving the consumer's purchase of goods and/or services from the mobile merchant.

As used herein, "transaction data" may include data related to one or more transactions as defined above. For example, transaction data can be included in one or more data messages associated with the processing of an electronic transaction conducted by a mobile merchant such as an authorization request message, an authorization response message, and the like. For an electronic transaction conducted by a mobile merchant, the corresponding transaction data can include the location of the mobile merchant (e.g., GPS coordinates, address, intersection, monument, landmark, etc.). The transaction data can also include a mobile merchant identifier (e.g., MVV, DBA, access device identifier, etc.), date, time, authorization amount (e.g., the transaction amount submitted for authorization), authorization category (e.g., approved, declined, chargeback, etc.), and other information. Transaction data can also include a unique transaction identifier, transaction class (e.g., credit, debit, prepaid, etc.), acquirer identifier, acquirer processor identifier, issuer identifier (e.g., BIN), issuer processor identifier, one or more error codes, cardholder or account holder information (e.g., name, date of birth, address, phone number, etc.), card verification value (CVV), expiration date, loyalty account information, and other information associated with the transaction.

As used herein, a "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to one or more databases and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

As used herein, a "client device" may include any suitable electronic device capable of electronically receiving notifications, such as a computer (e.g., a desktop computer, laptop computer, tablet computer, etc.), a cellular or wireless phone (e.g., a smart phone), a personal digital assistant (PDA), a pager, and the like.

As used herein, a "notification" may include any suitable electronic communication such as an e-mail, SMS message, instant message, page, telephone call, and the like.

As used herein, a "payment processing network" may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transaction, and other types of commercial transactions. VisaNet™, in particular, includes a VIP system (Visa Integrated Payments system) which processes authorization requests and a Base II system which performs clearing and settlement services.

As used herein, an "acquirer" may include a business entity (e.g., a commercial bank) that has a business relationship with a particular mobile merchant or other entity. As used herein, an "issuer" may include a business entity (e.g., a bank) that maintains financial accounts for consumers such as individuals, businesses, and other entities, and that may issue portable consumer devices such as credit and debit cards to consumers. Some entities may perform both issuer and acquirer functions. Embodiments of the invention encompass such single entity issuer-acquirers.

As used herein, an "authorization request message" may include a data message, or sequence of data messages, that requests an issuer of a payment account to authorize a transaction. An authorization request message according to an embodiment of the invention may comply with ISO (International Organization for Standardization) 8583, which is a standard for systems that exchange electronic transactions made by cardholders using payment cards. An authorization request message according to other embodiments may comply with other suitable standards.

As used herein, an "authorization response message" may include a data message, or sequence of data messages, that responds to a merchant's and/or acquirer's request to authorize a transaction. An authorization response message according to an embodiment of the invention may comply with ISO 8583, which, as described above, is a standard for systems that exchange electronic transactions made by cardholders using payment cards. An authorization response message according to other embodiments may comply with other suitable standards.

As used herein, a "social network" may include two or more entities (e.g., mobile merchants, stationary merchants, consumers, and the like) that are tied or connected by one or more types of interdependency such as common interest, personal relationships, financial exchange, and the like.

As used herein, "coupon data" may include data corresponding to a coupon associated with a benefit provided to a consumer in the context of a transaction as defined above. Such benefits may include a cost deduction for goods or services (e.g., a percentage deduction, a fixed amount deduction, etc.), free products or services (e.g., buy 1 get 1 free, buy product A get product B free, etc.), and the like. To receive a benefit associated with a coupon, a consumer may be required to purchase a single good or service, or multiple goods or services (e.g., an accumulated coupon). The benefit may be applied to the cost of a single good or service, multiple goods or services, or the total cost of all goods or services associated with a single payment transaction.

Embodiments of the invention are related to systems, apparatuses, and methods for determining the location of a mobile merchant, and performing further processing based on the determined location. In some embodiments, the further processing may comprise determining a location of a client device, generating a notification including the location of the mobile merchant, and transmitting the notification to the client device. As described herein, when a consumer makes a purchase at a mobile merchant, transaction data including the location of the mobile merchant can be included in an authorization request message transmitted to a server computer. In some embodiments, the server computer may be associated with payment processing network configured to process electronic payment transactions and to provide clearing and settlement services. Upon receipt of the transaction data, the server computer can determine the location of the mobile merchant. The server computer can further determine the location of a client device associated with another consumer, a stationary merchant, or another mobile merchant. A notification including the location of the mobile merchant can be generated, and the notification can be electronically transmitted to the client device. In some embodiments, the server computer may determine whether the distance between the location of the client device and the location of the mobile merchant is within a threshold value prior to transmitting the notification to the client device. In some embodiments, coupon data can be received from the mobile merchant and further included in the transmitted notification.

To illustrate, when a consumer makes a purchase at a mobile merchant using a portable consumer device (e.g., a credit card, debit card, etc.), the mobile merchant or consumer may swipe or scan the device at a mobile access device (e.g., a mobile POS terminal) of the mobile merchant. The terminal may then generate and transmit an authorization request message to the mobile merchant's acquirer. If the mobile POS terminal is capable of determining its geographic location (e.g., using GPS circuitry), the generated authorization request message can include the location of the terminal which may correspond to the location of the mobile merchant at the time of the transaction. For example, if the transaction conducted by the mobile merchant occurs at Location A, the generated authorization request message can include geographic coordinates that correspond to Location A.

Upon receipt by the mobile merchant's acquirer, the authorization request message can be forwarded to a server computer at a payment processing network. The server computer may then access a database to confirm that the mobile merchant is enrolled in a location notification service, and to determine the locations of client devices associated with enrolled consumers that have agreed to receive location notifications. For example, as part of the enrollment process, a consumer may register their client device (e.g., a GPS-enabled smart phone) which may periodically transmit its location to the server computer. If the distance between the client device (i.e. the consumer) and the mobile merchant is within a threshold value (e.g., 250 yards, 0.25 miles, 0.5 miles, 1 mile, etc.), the server computer may generate and transmit a notification (e.g., an SMS text message, e-mail, or the like) to the consumer's client device, the notification informing the consumer of the mobile merchant's location (i.e. Location A).

As another illustration, the consumer that conducted the initial transaction at the mobile merchant may be part of a social network including other consumers, and the database may store corresponding social network data. Upon receipt of the authorization request message for the transaction, the server computer may determine the identity of the consumer based on the identification information included in the transaction data. The database may then be accessed by the server computer to confirm that the consumer has enrolled in the location notification service and is part of a social network, and to determine the location of client devices associated with other enrolled members of the consumer's social network. If the distance between a client device and the mobile merchant is within a threshold value, the server computer may generate and transmit a notification to the client device associated with the member of the consumer's social network, the notification informing the member of the mobile merchant's location.

As another illustration, the notification can also include a coupon that can be redeemed at the mobile merchant. For example, the mobile merchant can transmit coupon data to the server computer, the coupon data corresponding to a discount to be applied to transactions conducted at the mobile merchant (e.g., 10% off, 25% off, 50% off, etc.). Once the coupon data is received and the locations of the mobile merchant and consumer determined, the notification may be generated to include the location of the mobile merchant in addition to a representation of the coupon (e.g., a QR code, bar code, etc.). Upon receipt at the client device, the consumer may redeem the coupon at the mobile merchant.

As another illustration, a stationary merchant (e.g., a restaurant) may want to be informed of mobile merchants conducting transactions nearby. Upon receipt of the authorization request message for a transaction conducted by a mobile merchant (e.g., a food truck), the server computer may access the database to confirm that the restaurant has enrolled in the location notification service. For example, the restaurant may have registered their location, and requested to receive notifications when a food truck is conducting transactions within a selected distance (e.g., 100 meters). As explained above, the server computer can determine the location of the mobile merchant based on the transaction data included in the authorization request message. The authorization request message may further include transaction data (e.g., merchant name, MVV, DBA, etc.) identifying the mobile merchant as a food truck. Upon determining that the location of the food truck is within the selected distance (i.e. 100 meters) from the restaurant, the server computer can transmit a notification to a registered client device associated with the restaurant, the notification informing the restaurant that the food truck is conducting transactions nearby.

As another illustration, mobile merchants offering complimentary products may want to be notified of each other's location. For example, Mobile Merchant A may be a food truck, and Mobile Merchant B may be a mobile vendor that sells beverages. Upon receipt of an authorization request message for a transaction conducted by Mobile Merchant A, the server computer can determine the location of Mobile Merchant A, and can access the database to confirm that Mobile Merchant A wants enrolled Mobile Merchant B to be notified of its location. In response, the server computer can generate and transmit a notification to Mobile Merchant B, the notification informing Mobile Merchant B of Mobile Merchant A's location.

I. Exemplary Systems

FIG. 1 shows a block diagram of a payment processing and notification system 100 that may be used in an embodiment of the invention. System 100 may include a consumer 102, a portable consumer device 104, a mobile access device 106 associated with a mobile merchant 108, an acquirer computer 110, a payment processing network 112, an issuer computer 114, and a client device 116 associated with a consumer 118.

Consumers 102 and 118 may each be an individual, or an organization such as a business that is capable of purchasing goods or services.

The portable consumer device 104 may be in any suitable form. For example, in embodiments of the invention, a suitable portable consumer device may be hand-held and compact so that it can fit into a consumer's wallet and/or pocket (e.g., pocket-sized). The portable consumer device 104 may include a processor, and memory, input devices, and output devices, operatively coupled to the processor. Specific examples of portable consumer devices may include cellular or wireless phones, personal digital assistants (PDAs), pagers, portable computers, smart cards, and the like. The portable consumer device 104 may also be a debit device (e.g., a debit card), credit device (e.g., a credit card), or stored value device (e.g., a pre-paid or stored value card).

The mobile merchant 108 may be an entity that can sell goods and/or services, and that can engage in transactions at different locations. The mobile merchant 108 may be associated with a mobile access device 106 which may be in any suitable form. Exemplary mobile access devices can include mobile point of sale (POS) devices, cellular phones (e.g., smart phones), PDAs, personal computers (PCs), tablet PCs, handheld specialized readers, set-top boxes, electronic cash registers, ATMs, virtual cash registers, kiosks, security systems, access systems, and the like. If mobile access device 106 is a mobile POS terminal, any suitable POS terminal may be used including card or phone readers. The card or phone readers may include any suitable contact or contactless mode of operation. For example, exemplary readers can include RF (radio frequency) antennas, magnetic stripe readers, etc. to interact with portable consumer device 104.

Figure 3:
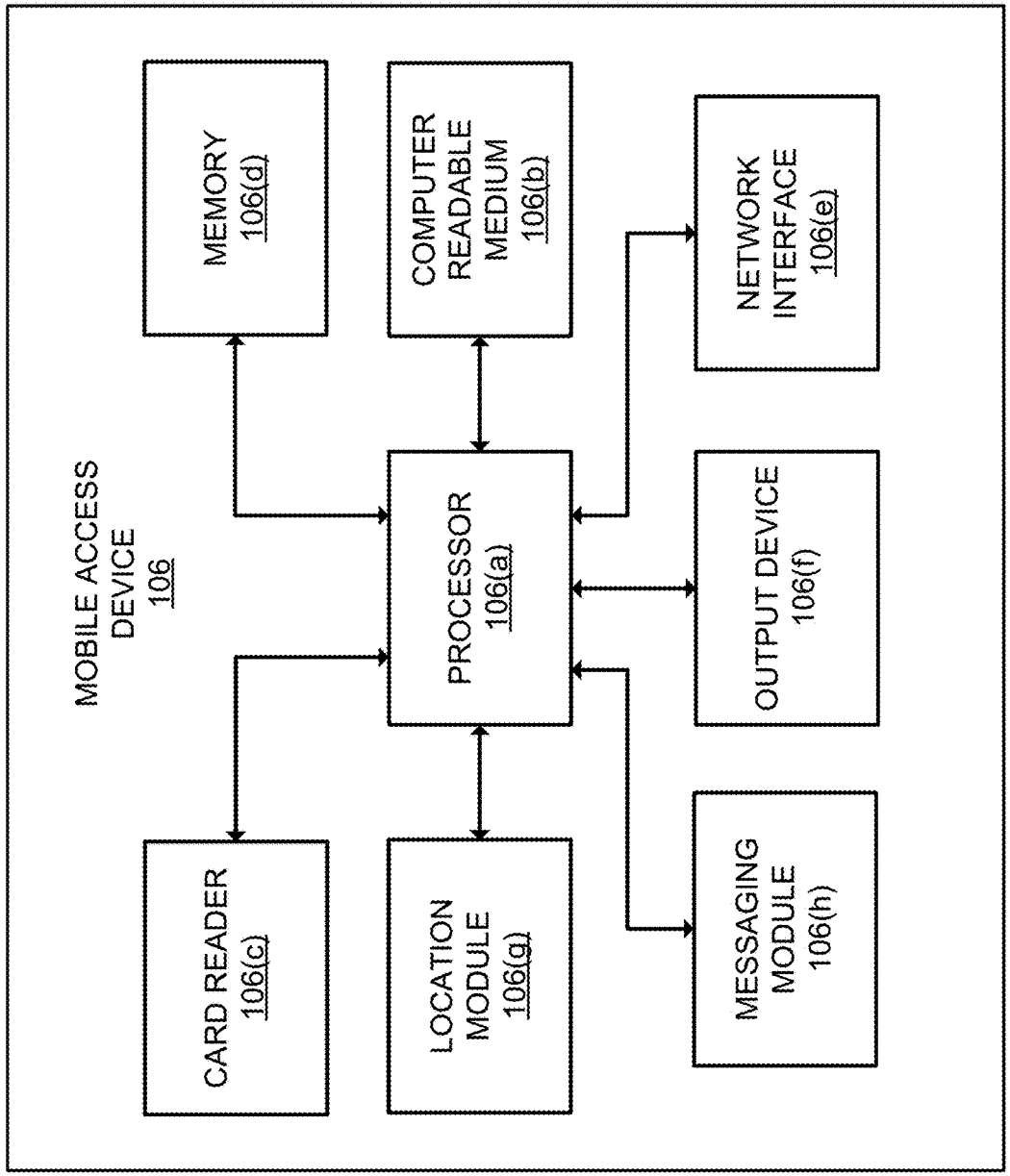
FIG. 3 shows a block diagram of an exemplary mobile access device according to an embodiment of the invention.

FIG. 3 shows a block diagram of mobile access device 106 according to an embodiment of the invention. As shown in FIG. 3, mobile access device 106 may comprise a processor 106(a). It may also comprise a computer readable medium 106(b), a card reader 106(c), a memory 106(d), a network interface 106(e), an output device 106(f), a location module 106(g), and a messaging module 106(h), all operatively coupled to processor 106(a). A housing may house one or more of these components. Output device 106(f) may include a display and/or an audio output device such as one or more speakers. Computer readable medium 106(b) may include one or more memory chips, disk drives, etc. Card reader 106(c) of mobile access device 106 may include one or more radio frequency (RF) antennas, magnetic stripe readers, etc., that can interact with portable consumer device 104.

Messaging module 106(h) may be configured to generate authorization request messages and/or to receive authorization response messages. Network interface 106(e) may be configured to cooperate with messaging module 106(h) to facilitate the exchange of authorization messages with acquirers, issuers, processors, and/or payment processing networks.

As described above, mobile access device 106 can include location module 106(g). In some embodiments, location module 106(g) may include software and/or hardware for determining a geographic location of mobile access device 106. For example, location module 106(g) may utilize a Global Positioning System (GPS), cellular phone tower triangulation data, cellular phone tower signal strength data, wireless access point location data, an Internet Protocol (IP) address, or any other suitable means for determining a geographic location of mobile access device 106.

In some embodiments, location module 106(g) may cooperate with messaging module 106(h) to generate authorization request messages including the geographic location of mobile access device 106 at the time of a transaction. For example, location module 106(g) may determine the geographic location of mobile access device 106, and transmit the location to messaging module 106(h) for insertion into an authorization request message. In some embodiments, messaging module 106(h) may generate an authorization request message including a location field, and insert the geographic location of mobile access device 106 as a data element into the location field. The geographic location may be inserted, for example, as geographic coordinates (e.g., GPS coordinates) and/or an address, intersection, monument, landmark, town, city, state, etc. In some embodiments, messaging module 106(h) can insert the geographic location of mobile access device 106 into an ISO 8583 message Returning to FIG. 1, mobile access device 106 may be communicatively coupled with acquirer computer 110. Acquirer computer 110 may be operated by an acquirer which may be a business entity (e.g., a commercial bank) that has a business relationship with mobile merchant 108 or other entity. The acquirer may facilitate authorization, settling, and clearing of electronic payment transactions for mobile merchant 108.

Payment processing network 112 may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transaction, and other types of commercial transactions. VisaNet™, in particular, includes a VIP system (Visa Integrated Payments system) which processes authorization requests and a Base II system which performs clearing and settlement services.

Issuer computer 114 may be operated by an issuer which may be a business entity (e.g., a bank) that maintains financial accounts for consumers such as individuals, businesses, and other entities, and that may issue portable consumer devices such as credit and debit cards to consumers. For example, the issuer that operates issuer computer 114 may issue portable consumer device 104 to consumer 102.

Client device 116 may include any suitable electronic device capable of electronically receiving notifications, such as a computer (e.g., a desktop computer, laptop computer, tablet computer, etc.), a cellular or wireless phone (e.g., a smart phone), a personal digital assistant (PDA), a pager, and the like.

In a purchase transaction, consumer 102 may purchase goods or services at mobile merchant 108 using the portable consumer device 104 which may include a smartphone, credit card, debit card, prepaid card, etc. Consumer 102 or mobile merchant 108 may cause portable consumer device 104 to interact with mobile access device 106 which may include a mobile POS terminal. For example, consumer 102 may take a debit card and swipe it though an appropriate slot in the POS terminal.

Alternatively, the POS terminal may be a contactless reader, and portable consumer device 104 may be a contactless device such as a contactless card or phone. For example, consumer 102 may take a contactless card or a phone and pass it in front of the contactless reader to transmit financial information stored on the device.

An authorization request message may then be generated by mobile access device 106 including the geographic location of mobile access device 106 (and hence the location of mobile merchant 108) and other transaction data (e.g., the transaction date, time, authorization amount, MW, DBA, etc.). The authorization request message may be transmitted by mobile access device 106 to acquirer computer 110. Upon receipt, acquirer computer 110 may transmit the authorization request message to payment processing network 112. The authorization request message may then be transmitted by payment processing network 112 to issuer computer 114.

After receiving the authorization request message, issuer computer 114 may perform a number of authorization, authentication, and fraud detection processes in order to make an authorization decision. Issuer computer 114 may then generate and send an authorization response message to payment processing network 112 indicating whether the transaction is approved. Payment processing network 112 may transmit the authorization response message to acquirer computer 110 which may then forward the authorization response message back to mobile access device 106.

Upon receipt of the authorization response message, mobile access device 106 may provide a representation of the authorization response message to consumer 102 on a display or printed out on a receipt.

At the end of the day, a normal clearing and settlement process may be conducted by payment processing network 112 in cooperation with issuer computer 114 and acquirer computer 110. A clearing process can be a process of exchanging financial details between an acquirer and an issuer to facilitate posting to a consumer's account and reconciliation of the consumer's settlement position. A settlement process can be a process of transferring funds between an acquirer and issuer. In some embodiments, authorization and settlement can occur simultaneously.

Payment processing network 112 may determine the location of mobile merchant 108 based on the transaction data included in the authorization request message for the transaction described above, and transmit a notification including the determined location to a client device associated with a nearby consumer. In some embodiments, the location of mobile merchant 108 can also be determined based on transaction data included in the authorization response message transmitted by issuer computer 114. Upon determining the location of mobile merchant 108, payment processing network 112 may determine the location of client device 116 associated with consumer 118. If it is determined that the distance between mobile merchant 106 and client device 116 is within a threshold value, payment processing network 112 can generate and transmit a notification to client device 116, the notification informing consumer 118 of the location of mobile merchant 108.

Figure 2:
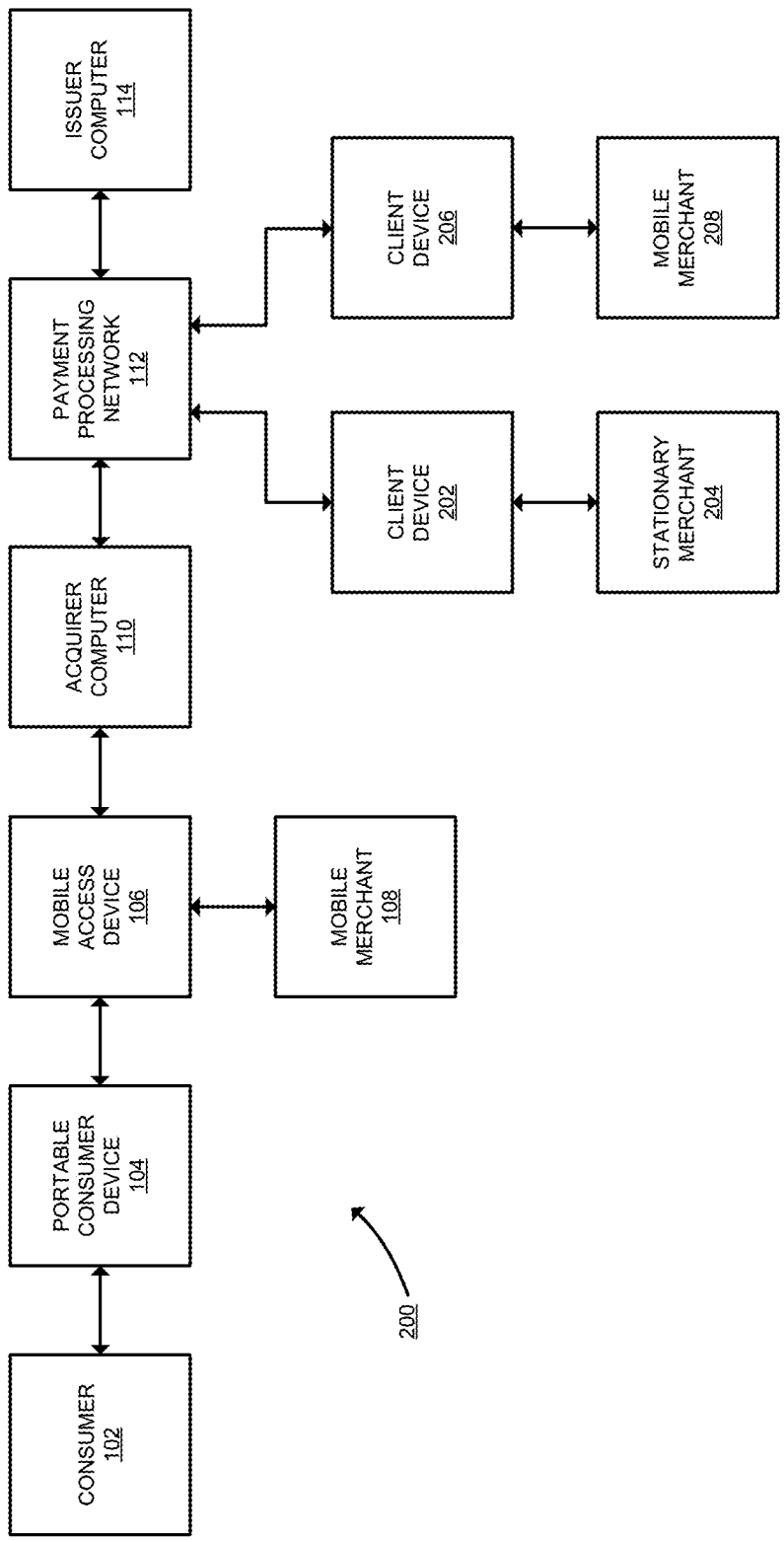
FIG. 2 shows a block diagram of a payment processing and notification system according to an embodiment of the invention.

In embodiments of the invention, as shown in FIG. 2, a location notification can also be transmitted by payment processing network 112 to a stationary merchant and/or another mobile merchant. FIG. 2 shows a block diagram of a payment processing and notification system 200 according to an embodiment of the invention. System 200 may include first consumer 102, portable consumer device 104, mobile access device 106, mobile merchant 108, acquirer computer 110, payment processing network 112, and issuer computer 114 shown in FIG. 1. Further, as shown in FIG. 2, system 200 can also include a client device 202 associated with a stationary merchant 204, and a client device 206 associated with a mobile merchant 208. In embodiments of the invention, stationary merchant 204 may be an entity that can sell goods and/or services, and that generally engages in transactions at a stationary location. For example, exemplary stationary merchants may include restaurants, cafes, supermarkets, pharmacies, big box stores, boutiques, and the like. Payment processing network 112 may determine the location of mobile merchant 108 based on the transaction data included in the authorization request message (and/or authorization response message) received for the transaction described above. Upon determining that the distance between mobile merchant 108 and stationary merchant 204 is within a threshold value, for example, a notification including the location of mobile merchant 108 can be transmitted to client device 202 associated with stationary merchant 204. In embodiments of the invention, a notification including the location of mobile merchant 108 can also be sent to client device 206 associated with mobile merchant 208. The components and functionalities of payment processing network 112 according to various embodiments of the invention are described in further detail below and shown in FIG. 4.

Figure 4:
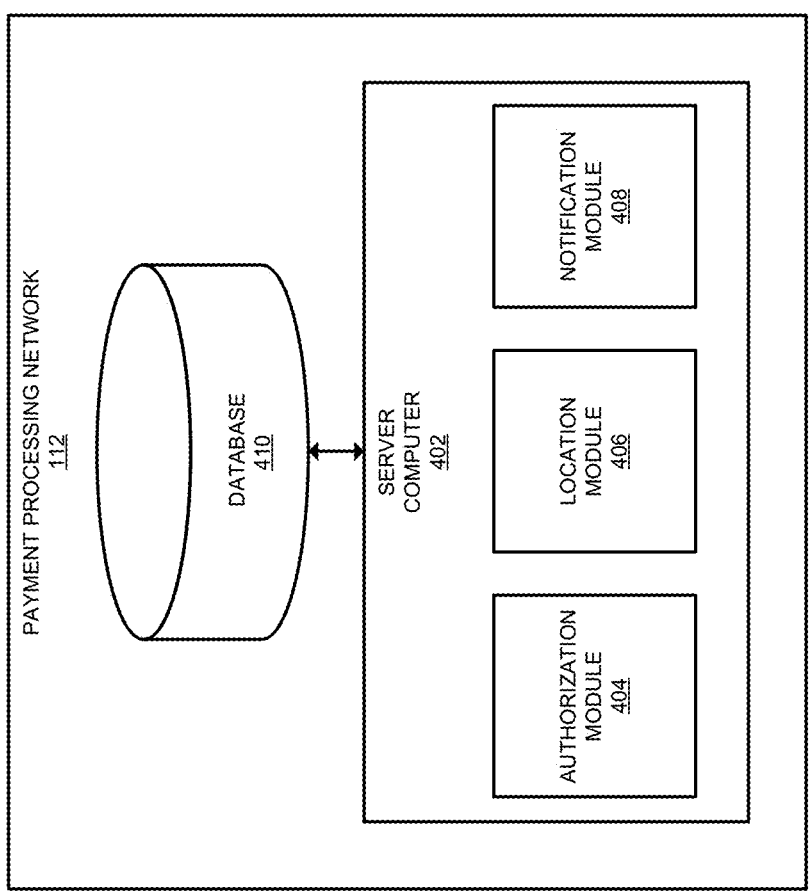
FIG. 4 shows a block diagram of a payment processing network according to an embodiment of the invention.

FIG. 4 shows a block diagram of a payment processing network 112 according to an embodiment of the invention. For simplicity of discussion, only one of each component is shown for several of the components. It is to be understood, however, that embodiments of the invention may include more than one of each component. In addition, some embodiments of the invention may include fewer than all of the components shown in FIG. 4. The various components shown in FIG. 4 may each be located within payment processing network 112, outside payment processing network 112, and/or distributed across different locations. Further, the components in FIG. 4 may communicate via any suitable communication medium such as the Internet using any suitable communication protocol.

Payment processing network 112 may include a server computer 402 in communication with mobile access device 106, acquirer computer 110, and issuer computer 114 shown in FIGS. 1 and 2. Server computer 402 may also be in communication with client device 116 associated with consumer 118 shown in FIG. 1, and with client device 202 associated with stationary merchant 204, and client device 206 associate with mobile merchant 208 shown in FIG. 2. Further, server computer 402 may be in communication with one or more acquirer processor computers and issuer processor computers (not shown) operated by one or more acquirer processors and issuer processors, respectively.

As shown in FIG. 4, server computer 402 may include an authorization module 404, a location module 406, and a notification module 408. The various modules may be embodied by computer code residing on a computer readable medium. Server computer 402 may be operatively coupled to one or more databases, including database 410.

Authorization module 404 may perform various functions related to receiving and forwarding authorization request and response messages, processing transaction data included in such authorization messages, and confirming a mobile merchant's enrollment in a location notification service according to embodiments of the invention. Upon receiving an authorization request message for a transaction conducted by mobile merchant 108 from acquirer computer 110, authorization module 404 may forward the authorization request message to issuer computer 114 for authorization of the transaction. If an authorization response message for the transaction is received from issuer computer 114, authorization module 404 may route the authorization response message to mobile access device 106 via acquirer computer 110. As described herein, the authorization request and/or response messages can include transaction data such as the location and identifying information for mobile merchant 108. Upon receipt of an authorization request message, for example, authorization module 404 can extract the location and identifying information for mobile merchant 108 from the transaction data contained in the authorization request message. Authorization module 404 may then access database 410, and utilize the received identifying information to determine whether mobile merchant 108 is enrolled in a location notification service. If mobile merchant 108 is not enrolled, authorization module 404 can forward the authorization request message to issuer computer 114 for authorization of the transaction. If, however, authorization module 404 determines that mobile merchant 108 is enrolled in the location notification service, authorization module 404 may also transmit the location and identifying information for mobile merchant 108 to location module 406 for further processing.

Location module 406 may perform various functions related to determining the location of enrolled consumers, stationary merchants, and mobile merchants, determining whether distance thresholds have been met, determining notification preferences, processing and storing location data received from client devices, determining the current location of client devices, processing social network data, processing coupon data, and communicating with notification module 408 to transmit notifications to client devices. For example, upon receiving the location and identifying information for mobile merchant 108 from authorization module 404, location module 406 can access database 410 to determine if a notification including the location of mobile merchant 108 is to be transmitted to consumer 118, stationary merchant 204, and/or mobile merchant 208 via their respective client devices. Such determination may include determining whether the distance between the location of mobile merchant 108 and a client device is within a threshold value. In embodiments of the invention, threshold values may be set based on preferences provided during an enrollment process, best practice values, recommended values, default values, etc. In some embodiments, location module 406 may receive and process location data for consumers, stationary merchants, and mobile merchants, and store the location data in database 410. For example, location data such as one or more physical addresses (e.g., street addresses) can be provided during the enrollment process and stored in database 410 by location module 406. In some embodiments, a client device may periodically transmit or "push" its location (e.g., as geographic coordinates) to server computer 402 for storage in database 410 by location module 406. In some embodiments, an application (e.g., a smartphone application) running on a client device may be utilized to push the location of the client device to server computer 402. In other embodiments, location module 406 of server computer 402 may periodically establish communication with client device 116 to request or "pull" the location data from client device 116 for storage in database 410.

Location module 406 may also access database 410 to determine preferences such as client device addresses (e.g., phone numbers, e-mail address, IP addresses, etc.), notification format types (e.g., SMS, e-mail, or the like), the type or category of mobile merchants for which notifications are to be provided (e.g., food, beverage, dessert, souvenirs, and the like), and other preferences. In some embodiments, location module 406 may be configured to determine social network data for a consumer, stationary merchant, or mobile merchant as stored in database 410. Such social network data may include identifying information, the location and client device addresses, and other information for members of a social network that are to receive a notification. Location module 406 may be further configured to receive coupon data from a mobile merchant, and to transmit the coupon data to notification module 408 for inclusion in a notification.

When location module 406 determines that a notification is to be transmitted to a consumer, stationary merchant, or mobile merchant, location module 406 may transmit various information to notification module 408. For example, based on the transaction data included in the a received authorization request message for a transaction conducted at a mobile merchant, location module 406 may provide notification module 408 with the location of the mobile merchant. In some embodiments, if the location included in the original transaction data is received as geographic coordinates, location module 406 may first convert the geographic coordinates into a more convenient format before transmitting the location to notification module 408. For example, location module 406 may map the geographic coordinates to an address, intersection, monument, landmark, and the like, and transmit the reformatted location for the mobile merchant to notification module 408. In some embodiments, location module 406 may also provide notification module 408 with an identifier for the mobile merchant (e.g., a merchant name, MW, DBA, and the like), a type or category for the mobile merchant, a client device address, a notification format type, and any other suitable information included in the received transaction data or stored as a preference in database 410. If coupon data is received from the mobile merchant, such data may also be transmitted to notification module 408 for inclusion in a notification.

Notification module 408 may perform various functions related to generating and transmitting notifications to consumers, stationary merchants, and/or mobile merchants. As described above, notification module 408 can receive location data for a mobile merchant, a mobile merchant identifier, a mobile merchant type or category, a client device address, a notification format type, coupon data, and other information from location module 406. Upon receipt, notification module 408 can generate a notification including the location of the mobile merchant, and other information received from location module 406. In embodiments of the invention, notifications can be transmitted in any suitable electronic form such as an e-mail, SMS message, instant message, page, telephone call, and the like.

II. Exemplary Methods

FIGS. 5-9 illustrate flow diagrams for methods 500-900. The steps of methods 500-900 may be performed, for example, by server computer 402 shown in FIG. 4. In other embodiments of the invention, one or more steps of methods 500-900 may be performed by any other suitable computer system, such as mobile access device 106, acquirer computer 110, issuer computer 114, and/or client devices 116, 202, and 206 shown in FIGS. 1 and 2. In some embodiments, one or more steps of method 500 may be performed by an issuer processor computer, an acquirer processor computer, or any other suitable computer system.

As described above, when a transaction is conducted at a mobile merchant, the merchant's mobile access device can generate an authorization request message including transaction data such as the location of the mobile access device at the time of the transaction. For example, the merchant's mobile access device may utilize a Global Position System (GPS), cellular phone tower triangulation data, cellular phone tower signal strength data, wireless access point location data, an Internet Protocol (IP) address, or any other suitable means for determining a geographic location of the mobile access device. In some embodiments, a mobile access device may generate an authorization request message for a transaction including a location field, and insert the geographic location of the mobile access device as a data element into the location field. The geographic location may be inserted, for example, as GPS coordinates and/or an address, intersection, monument, landmark, town, city, state, etc. In some embodiments, a mobile access device can insert the geographic location into an ISO 8583 message. As further described above, an authorization request message generated for the transaction may further include other transaction data such as an identifier for the mobile merchant (e.g., merchant name, MW, DBA, and the like), a type or category of the mobile merchant (e.g., food, food type, beverages, dessert, souvenirs, and the like), an authorization amount, time, date, and other information related to the transaction. In some embodiments, transaction data may be generated and transmitted by other entities shown in FIGS. 1-2. For example, transaction data including the time, date, location, and other information for a transaction may be included in an authorization response message received by server computer 402 from issuer computer 114.

Figure 5:
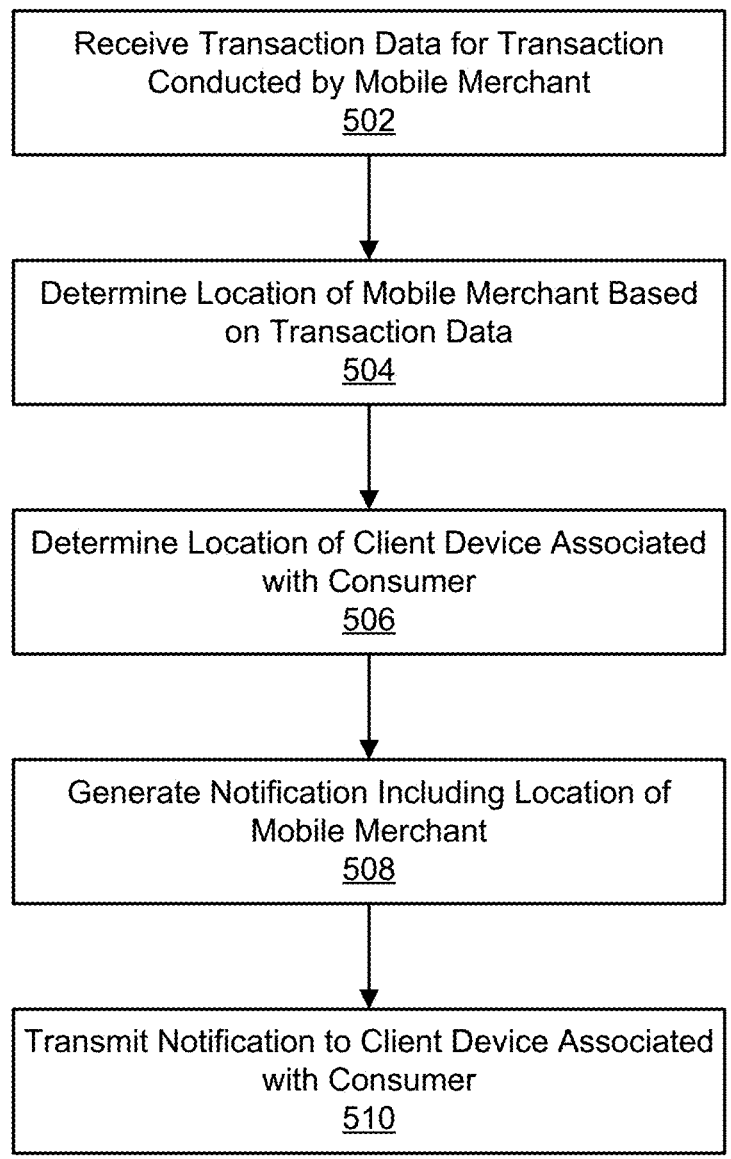
FIG. 5 illustrates a flow diagram showing a method for determining a location of a mobile merchant, and sending a notification including the location of the mobile merchant to a client device associated with a consumer according to an embodiment of the invention.

FIG. 5 illustrates a flow diagram showing a method 500 for determining a location of a mobile merchant, and sending a notification including the location of the mobile merchant to a client device associated with a consumer according to an embodiment of the invention.

In FIG. 5, at step 502, method 500 may begin by server computer 402 receiving transaction data for a transaction conducted by a mobile merchant. As described above, in embodiments of the invention, the transaction data may be included as part of an authorization request message for the transaction. To illustrate, referring back to FIG. 1, consumer 102 may initiate the transaction with mobile merchant 108 by swiping or scanning portable consumer device 104 at mobile access device 106. If, for example, mobile merchant 108 is located at Location A, mobile access device 106 can generate the authorization request message to include geographic coordinates for Location A. Mobile access device 106 may then transmit the authorization request message to acquirer computer 110, which may forward the message to server computer 402 of payment processing network 112.

In embodiments of the invention, at step 502, server computer 402 may confirm that the mobile merchant is enrolled in a location notification service. For example, the transaction data included in the authorization request message may further include an identifier of the mobile merchant. Upon receipt of the authorization request message, authorization module 404 may access database 410 to determine whether the mobile merchant is enrolled. If it is determined that the mobile merchant is not enrolled, authorization module 404 may simply forward the authorization request message to issuer computer 114 for authorization of the transaction. If, however, the mobile merchant is enrolled in the location notification service, method 500 may proceed to step 504.

At step 504, server computer 402 may determine the location of the mobile merchant based on the received transaction data. For example, if the transaction data is received as part of an authorization request message, authorization module 404 of server computer 402 may analyze the authorization request message to determine the location of the mobile merchant as included in the transaction data. Referring back to the above illustration, authorization module 404 may analyze the geographic coordinates included in the authorization request message generated and transmitted by access device 106, and determine that mobile merchant 108 is currently conducting transactions at Location A.

At step 506, server computer 402 may determine the location of a client device associated with a consumer. For example, location module 406 may access database 410 to determine the locations of client devices associated with consumers enrolled in the location notification service. The location of the client devices, as stored in database 410, may be received in a number of different ways according to various embodiments of the invention. In some embodiments, the client device may transmit or "push" its location to server computer 402. In some embodiments, server computer may 402 transmit a request to the client device for the device's location, i.e. by a "pull" process. In response, the client device may transmit its location to server computer 402. In either case, the location may be transmitted by the client device periodically, based on a schedule established by the consumer or mobile merchant, in response to the consumer interacting with an application running on the client device, or by any other suitable mechanism according to embodiments of the invention.

In some embodiments, at step 506, location module 406 may determine whether the distance between the location of the mobile merchant and the location of the client device is within a threshold value. For example, during the enrollment process, the consumer and/or mobile merchant may provide a threshold distance value (e.g., 250 yards, 0.25 miles, 0.5 miles, 1 mile, etc.). Threshold distance values may also be determined by recommended values, best practice values, default values, etc. If location module 406 determines that the distance between the client device and the mobile merchant exceeds the threshold value, in some embodiments, a notification may not be transmitted, and the authorization request message may simply be forwarded to issuer computer 114 for authorization of the transaction. If, however, the distance between the mobile merchant and the client device is within the threshold value, method 500 may proceed to step 508. Referring back to the above illustration, location module 406 may access database 410 and determine that client device 116 is located 0.4 miles away from Location A where mobile merchant 108 is currently conducting transactions, and that the threshold distance value established by consumer 118 during the enrollment process is 0.5 miles. Since the distance between client device 116 and Location A is within the threshold distance value, method 500 may proceed to step 508.

It should be noted that in some embodiments of the invention, a mobile merchant category or type may also be considered when determining whether to transmit a location notification to the consumer. For example, during enrollment, the consumer may establish that they desire to receive location notifications only for mobile merchants that sell a particular type of food, beverage, or the like. Thus, before proceeding to step 508, location module 406 may access database 410 to further confirm that the mobile merchant is of a particular category or type for which the consumer desires to receive location notifications.

At step 508, server computer 402 may generate a notification including the location of the mobile merchant. For example, at step 508, location module 406 may transmit the location of the mobile merchant, an identifier of the mobile merchant, and other information to notification module 408. In some embodiments, if the location of the mobile merchant is received as geographic coordinates, location module 406 may first convert the location into a format more convenient for the consumer. For example, location module 406 may map the geographic coordinates to an address, intersection, landmark, monument, etc., and transmit the reformatted location information to notification module 408. Location module 406 may also provide notification module 408 with various consumer preferences stored in database 410 such as a client device address (e.g., phone number, e-mail address, IP address, etc.), a notification format type (e.g., e-mail, SMS, etc.), and any other suitable consumer preference. Notification module 408 may then generate a notification including the location of the mobile merchant. Referring back to the above illustration, at step 508, location module 406 may determine that consumer 118 prefers to receive notifications in the form of an SMS message. Upon transmitting this preference to notification module 408 along with the location of mobile merchant 108, notification module 408 may generate an SMS message indicating that mobile merchant 108 is currently conducting transactions at Location A.

At step 510, server computer 402 may transmit the notification including the location of the mobile merchant to the client device. According to embodiments of the invention, the notification can be transmitted using any suitable electronic communication channel and in any suitable electronic form such as an e-mail, SMS message, instant message, page, telephone call, and the like. Referring back to the above illustration, at step 510, notification module 408 may transmit the notification to client device 116 as an SMS text message, the notification informing consumer 118 that mobile merchant 108 is currently conducting transaction at Location A.

Figure 6:
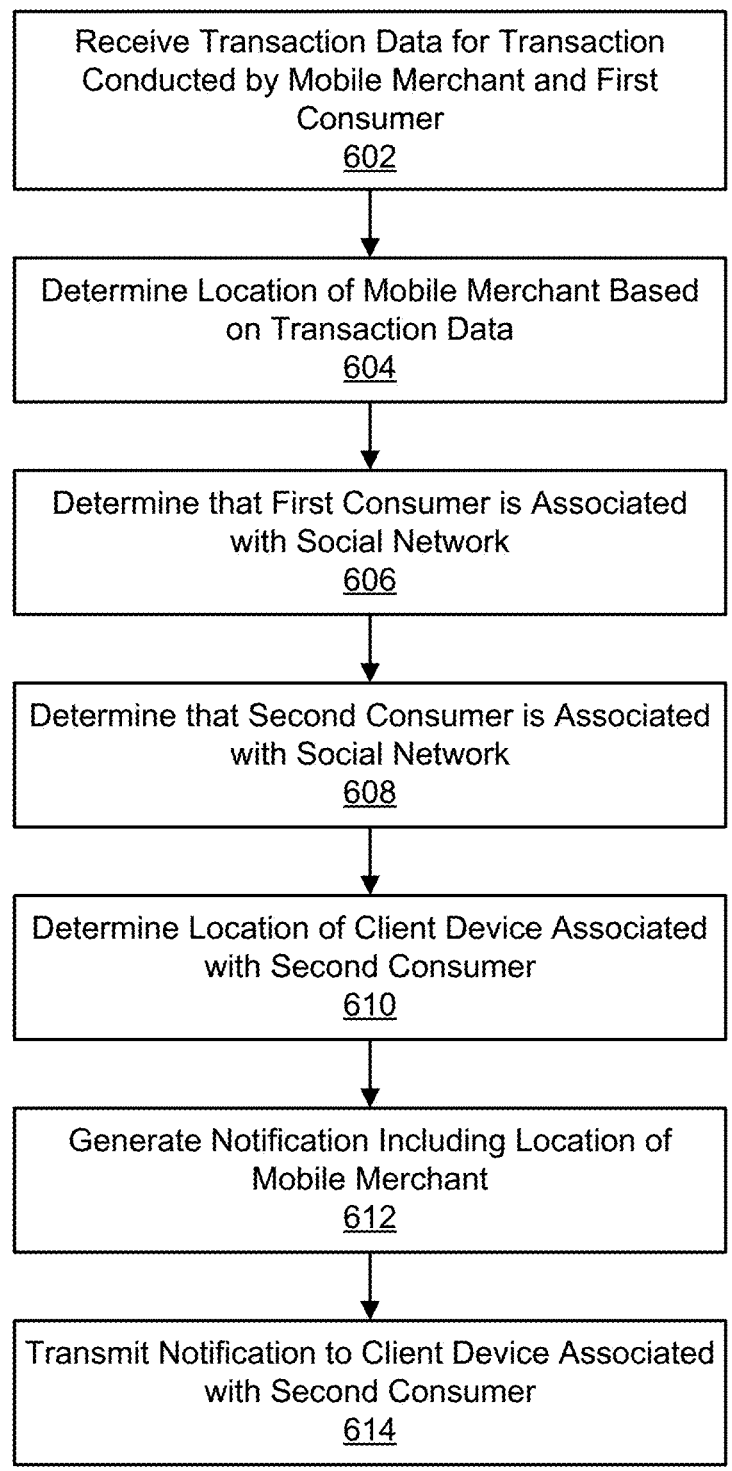
FIG. 6 illustrates a flow diagram showing a method for determining a location of a mobile merchant, and sending a notification including the location of the mobile merchant to a client device associated with a consumer identified based on social network data according to an embodiment of the invention.

In embodiments of the invention, social network data may also be analyzed to identify consumers to which a notification is to be sent. FIG. 6 illustrates a flow diagram showing a method 600 for determining a location of a mobile merchant, and sending a notification including the location of the mobile merchant to a client device associated with a consumer identified based on social network data according to an embodiment of the invention.

In FIG. 6, at step 602, method 600 may begin by server computer 402 receiving transaction data for a transaction conducted by a mobile merchant and a first consumer. As described above, in embodiments of the invention, the transaction data may be included as part of an authorization request message for the transaction. To illustrate, referring back to FIG. 1, consumer 102 may initiate the transaction with mobile merchant 108 by swiping or scanning portable consumer device 104 at mobile access device 106. If, for example, mobile merchant 108 is located at Location A, mobile access device 106 can generate the authorization request message to include geographic coordinates for Location A. Mobile access device 106 may then transmit the authorization request message to acquirer computer 110, which may forward the message to server computer 402 of payment processing network 112.

In embodiments of the invention, at step 602, server computer 402 may confirm that the mobile merchant is enrolled in a location notification service. For example, the transaction data included in the authorization request message may further include an identifier of the mobile merchant. Upon receipt of the authorization request message, authorization module 404 may access database 410 to determine whether the mobile merchant is enrolled. If it is determined that the mobile merchant is not enrolled, authorization module 404 may simply forward the authorization request message to issuer computer 114 for authorization of the transaction. If, however, the mobile merchant is enrolled in the location notification service, method 600 may proceed to step 604.

At step 604, server computer 402 may determine the location of the mobile merchant based on the received transaction data. For example, if the transaction data is received as part of an authorization request message, authorization module 404 of server computer 402 may analyze the authorization request message to determine the location of the mobile merchant as included in the transaction data. Referring back to the above illustration, authorization module 404 may analyze the geographic coordinates included in the authorization request message generated and transmitted by access device 106, and determine that mobile merchant 108 is currently conducting transactions at Location A.

Server computer 402, at step 606, may determine that the first consumer is associated with a social network. For example, the transaction data included in the authorization request message may include identification information for the first consumer. Using such identification information, location module 406 may access database 410 to confirm enrollment by the first consumer in the location notification service. Upon confirming enrollment, location module 406 may determine that the first consumer is associated with a social network based on social network data stored in database 410. At step 608, server computer 402 may determine that a second consumer is also associated with the social network. Referring back to the above illustration, at steps 606 and 608, location module 406 may access database 410 and determine that consumer 102 is associated with a social network, and that consumer 118 is also associated with the social network.

At step 610, server computer 402 may determine the location of a client device associated with the second consumer. As explained above with respect to FIG. 5, the location of a client device, as stored in database 410, may be received in a number of different ways according to various embodiments of the invention. In some embodiments, the client device may transmit or "push" its location to server computer 402. In some embodiments, server computer may 402 transmit a request to the client device for the device's location, i.e. by a "pull" process. In response, the client device may transmit its location to server computer 402. In either case, the location may be transmitted by the client device periodically, based on a schedule established by the consumer or mobile merchant, in response to the consumer interacting with an application running on the client device, or by any other suitable mechanism according to embodiments of the invention.

In some embodiments, at step 610, location module 406 may determine whether the distance between the location of the mobile merchant and the location of the client device associated with the second consumer is within a threshold value. For example, during the enrollment process, a consumer and/or mobile merchant may provide a threshold distance value (e.g., 250 yards, 0.25 miles, 0.5 miles, 1 mile, etc.). Threshold distance values may also be determined by recommended values, best practice values, default values, etc. If location module 406 determines that the distance between the client device associated with the second consumer and the mobile merchant exceeds the threshold value, in some embodiments, a notification may not be transmitted, and the authorization request message may simply be forwarded to issuer computer 114 for authorization of the transaction. If, however, the distance between the mobile merchant and the client device associated with the second consumer is within the threshold value, method 600 may proceed to step 612. Referring back to the above illustration, at step 610, location module 406 may access database 410 and determine that client device 116 associated with consumer 118 is located 0.3 miles away from Location A where mobile merchant 108 is currently conducting transactions, and that the threshold distance value established by consumer 118 during the enrollment process is 0.5 miles. Since the distance between client device 116 and Location A is within the threshold distance value, method 600 may proceed to step 612.

As explained above, in some embodiments of the invention, a mobile merchant category or type may also be considered when determining whether to transmit a location notification to the second consumer. For example, during enrollment, in addition to providing social network data, the second consumer may establish that they desire to receive location notifications only for mobile merchants that sell food, beverages, etc. In some embodiments, restrictions on the type or category of mobile merchants may also be selected by the first consumer. In either case, before proceeding to step 612, location module 406 may access database 410 to further confirm that the mobile merchant is of a particular category or type.

At step 612, server computer 402 may generate a notification including the location of the mobile merchant. For example, at step 612, location module 406 may transmit the location of the mobile merchant, an identifier of the mobile merchant, and other information to notification module 408. In some embodiments, as described above with respect to FIG. 5, if the location of the mobile merchant is received as geographic coordinates, location module 406 may first convert the location into a format more convenient for the consumer such as an address, intersection, landmark, monument, etc., and transmit the reformatted location information to notification module 408. Location module 406 may also provide notification module 408 with various preferences for the second consumer stored in database 410 such as a client device address (e.g., phone number, e-mail address, IP address, etc.), a notification format type (e.g., e-mail, SMS, etc.), and any other suitable consumer preference. Notification module 408 may then generate a notification including the location of the mobile merchant. Referring back to the above illustration, at step 612, location module 406 may determine that consumer 118 prefers to receive notifications in the form of an e-mail message. Upon transmitting this preference to notification module 408 along with the location of mobile merchant 108, notification module 408 may generate an e-mail message indicating that mobile merchant 108 is currently conducting transactions at Location A.

At step 614, server computer 402 may transmit the notification including the location of the mobile merchant to the client device associated with the second consumer. According to embodiments of the invention, the notification can be transmitted in any suitable electronic form such as an e-mail, SMS message, instant message, page, telephone call, and the like. Referring back to the above illustration, at step 614, notification module 408 may transmit the notification to client device 116 as an e-mail message, the notification informing consumer 118 that mobile merchant 108 is currently conducting transaction at Location A.

Mobile merchants may also desire to provide potential customers with real-time dynamic coupons. For example, in the case of perishable goods, a mobile merchant may want to provide discounts or other promotions for specific goods to reduce the amount of unsold perishable goods that must be discarded at the end of the day. In some embodiments, such coupons may be transmitted to consumers as part of a location notification.

Figure 7:
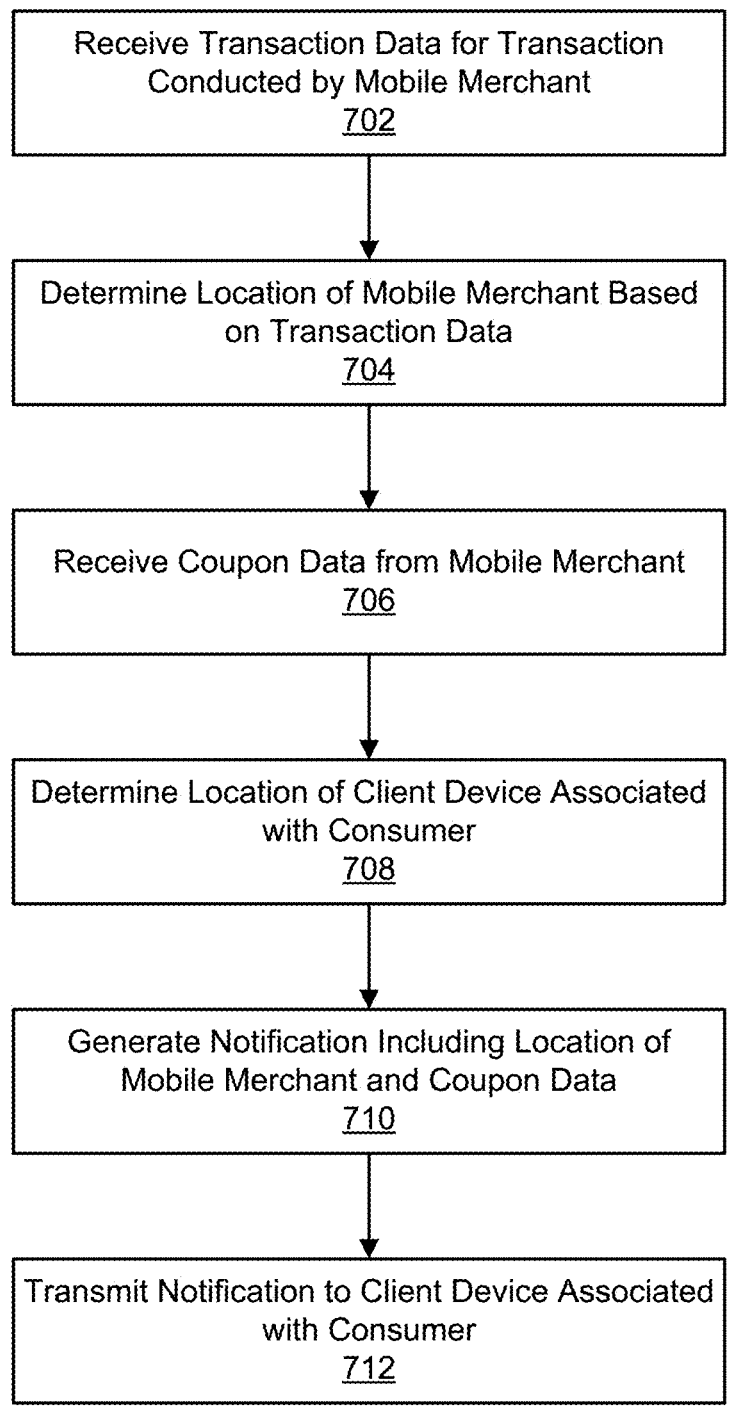
FIG. 7 illustrates a flow diagram showing a method for determining a location of a mobile merchant, and sending a notification including the location of the mobile merchant and coupon data to a client device associated with a consumer according to an embodiment of the invention.

FIG. 7 illustrates a flow diagram showing a method 700 for determining a location of a mobile merchant, and sending a notification including the location of the mobile merchant and coupon data to a client device associated with a consumer according to an embodiment of the invention.

In FIG. 7, at step 702, method 700 may begin by server computer 402 receiving transaction data for a transaction conducted by a mobile merchant. As described above, in embodiments of the invention, the transaction data may be included as part of an authorization request message for the transaction. To illustrate, referring back to FIG. 1, consumer 102 may initiate the transaction with mobile merchant 108 by swiping or scanning portable consumer device 104 at mobile access device 106. If, for example, mobile merchant 108 is located at Location A, mobile access device 106 can generate the authorization request message to include geographic coordinates for Location A. Mobile access device 106 may then transmit the authorization request message to acquirer computer 110, which may forward the message to server computer 402 of payment processing network 112.

In embodiments of the invention, at step 702, server computer 402 may confirm that the mobile merchant is enrolled in a location notification service. For example, the transaction data included in the authorization request message may further include an identifier of the mobile merchant. Upon receipt of the authorization request message, authorization module 404 may access database 410 to determine whether the mobile merchant is enrolled. If it is determined that the mobile merchant is not enrolled, authorization module 404 may simply forward the authorization request message to issuer computer 114 for authorization of the transaction. If, however, the mobile merchant is enrolled in the location notification service, method 700 may proceed to step 704.

At step 704, server computer 402 may determine the location of the mobile merchant based on the received transaction data. For example, if the transaction data is received as part of an authorization request message, authorization module 404 of server computer 402 may analyze the authorization request message to determine the location of the mobile merchant as included in the transaction data. Referring back to the above illustration, authorization module 404 may analyze the geographic coordinates included in the authorization request message generated and transmitted by access device 106, and determine that mobile merchant 108 is currently conducting transactions at Location B.

At step 706, server computer 402 may receive coupon data from the mobile merchant. For example, the mobile merchant may transmit a message to server computer 402 via a smartphone application or by accessing a web interface, the message including coupon data identifying a discount or other promotion to be applied to some or all transactions conducted at the mobile merchant. The coupon data may be transmitted over any suitable electronic communication medium such as the Internet. Referring back to the above illustration, at step 706, mobile access device 106 may be a smartphone, and mobile merchant 108 may utilize an application running on the smartphone to transmit coupon data to server computer 402. Mobile merchant 108 may, for example, specialize in selling pizza slices, and if a large number of pepperoni pizza slices have been prepared but not sold, mobile merchant 108 may transmit coupon data associated with a 50% discount on pepperoni pizza slices to server computer 402. The coupon data may be processed, for example, by location module 406, and the method may then proceed to step 708.

At step 708, server computer 402 may determine the location of a client device associated with a consumer. For example, location module 406 may access database 410 to determine the locations of client devices associated with consumers enrolled in the location notification service. As explained above with respect to FIGS. 5-6, the location of the client devices, as stored in database 410, may be received in a number of different ways according to various embodiments of the invention. In some embodiments, the client device may transmit or "push" its location to server computer 402. In some embodiments, server computer may 402 transmit a request to the client device for the device's location, i.e. by a "pull" process. In response, the client device may transmit its location to server computer 402. In either case, the location may be transmitted by the client device periodically, based on a schedule established by the consumer or mobile merchant, in response to the consumer interacting with an application running on the client device, or by any other suitable mechanism according to embodiments of the invention.

In some embodiments, at step 708, location module 406 may determine whether the distance between the location of the mobile merchant and the location of the client device is within a threshold value. For example, during the enrollment process, a consumer and/or mobile merchant may provide a threshold distance value (e.g., 250 yards, 0.25 miles, 0.5 miles, 1 mile, etc.). Threshold distance values may also be determined by recommended values, best practice values, default values, etc. If location module 406 determines that the distance between the client device and the mobile merchant exceeds the threshold value, in some embodiments, a notification may not be transmitted, and the authorization request message may simply be forwarded to issuer computer 114 for authorization of the transaction. If, however, the distance between the mobile merchant and the client device is within the threshold value, method 700 may proceed to step 710. Referring back to the above illustration, at step 708, location module 406 may access database 410 and determine that client device 116 is located 0.2 miles away from Location B where mobile merchant 108 is currently conducting transactions, and that the threshold distance value established by consumer 118 during the enrollment process is 0.5 miles. Since the distance between client device 116 and Location B is within the threshold distance value, method 700 may proceed to step 710.

It should be noted that in some embodiments of the invention, a mobile merchant category or type may also be considered when determining whether to transmit a location notification to the consumer. For example, during enrollment, the consumer may establish that they desire to receive location notifications only for mobile merchants that sell food, beverages, etc. Thus, before proceeding to step 710, location module 406 may access database 410 to further confirm that the mobile merchant is of a particular category or type for which the consumer desires to receive location notifications.

At step 710, server computer 402 may generate a notification including the location of the mobile merchant and the coupon data. For example, at step 710, location module 406 may transmit the location of the mobile merchant, an identifier of the mobile merchant, the coupon data, and other information to notification module 408. In some embodiments, if the location of the mobile merchant is received as geographic coordinates, location module 406 may first convert the location into a format more convenient for the consumer such as an address, intersection, landmark, monument, etc., and transmit the reformatted location information to notification module 408. Location module 406 may also provide notification module 408 with various consumer preferences stored in database 410 such as a client device address (e.g., phone number, e-mail address, IP address, etc.), a notification format type (e.g., e-mail, SMS, etc.), and any other suitable consumer preferences. Notification module 408 may then generate a notification including the location of the mobile merchant. Referring back to the above illustration, at step 710, location module 406 may determine that consumer 118 prefers to receive notifications in the form of an SMS message. Upon transmitting this preference to notification module 408 along with the location of mobile merchant 108 and the coupon data, notification module 408 may generate an SMS message indicating that mobile merchant 108 is currently conducting transactions at Location B and that a 50% discount is being offered for pepperoni pizza slices.

At step 712, server computer 402 may transmit the notification including the location of the mobile merchant and the coupon data to the client device. According to embodiments of the invention, the notification can be transmitted in any suitable electronic form such as an e-mail, SMS message, instant message, page, telephone call, and the like. Referring back to the above illustration, at step 712, notification module 408 may transmit the notification to client device 116 as an SMS text message, the notification informing consumer 118 that mobile merchant 108 is currently conducting transaction at Location A and that a 50% discount is currently being offered for pepperoni pizza slices. For example, the SMS message may include an embedded QR code representing the 50% discount that may be scanned by mobile merchant 108.

Stationary merchants may also want to be notified if a mobile merchant is conducting transactions nearby. For example, if a mobile merchant such as a food truck conducts transactions in the vicinity of a stationary merchant such as a restaurant, the restaurant may potentially lose sales to the food truck. In embodiments of the invention, stationary merchants may enroll in the location notification service, and be provided with notifications when one or more types or categories of mobile merchants are conducting transactions nearby.

Figure 8:
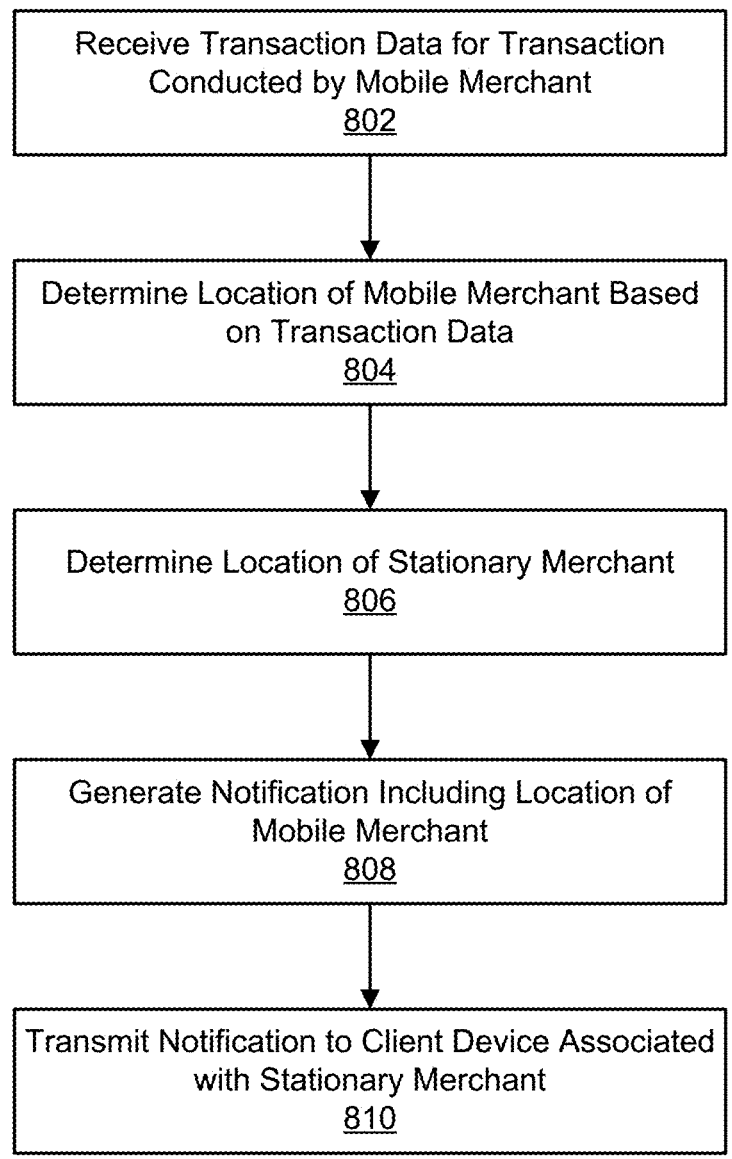
FIG. 8 illustrates a flow diagram showing a method for determining a location of a mobile merchant, and sending a notification including the location of the mobile merchant to a client device associated with a stationary merchant according to an embodiment of the invention.

FIG. 8 illustrates a flow diagram showing a method 800 for determining a location of a mobile merchant, and sending a notification including the location of the mobile merchant to a client device associated with a stationary merchant according to an embodiment of the invention.

In FIG. 8, at step 802, method 800 may begin by server computer 402 receiving transaction data for a transaction conducted by a mobile merchant. As described above, in embodiments of the invention, the transaction data may be included as part of an authorization request message for the transaction. To illustrate, referring back to FIG. 2, consumer 102 may initiate the transaction with mobile merchant 108 by swiping or scanning portable consumer device 104 at mobile access device 106. If, for example, mobile merchant 108 is located at Location A, mobile access device 106 can generate the authorization request message to include geographic coordinates for Location A. Mobile access device 106 may then transmit the authorization request message to acquirer computer 110, which may forward the message to server computer 402 of payment processing network 112.

In embodiments of the invention, at step 802, server computer 402 may confirm that the mobile merchant is enrolled in a location notification service. For example, the transaction data included in the authorization request message may further include an identifier of the mobile merchant. Upon receipt of the authorization request message, authorization module 404 may access database 410 to determine whether the mobile merchant is enrolled. If it is determined that the mobile merchant is not enrolled, authorization module 404 may simply forward the authorization request message to issuer computer 114 for authorization of the transaction. If, however, the mobile merchant is enrolled in the location notification service, method 800 may proceed to step 804.

At step 804, server computer 402 may determine the location of the mobile merchant based on the received transaction data. For example, if the transaction data is received as part of an authorization request message, authorization module 404 of server computer 402 may analyze the authorization request message to determine the location of the mobile merchant as included in the transaction data. Referring back to the above illustration, authorization module 404 may analyze the geographic coordinates included in the authorization request message generated and transmitted by access device 106, and determine that mobile merchant 108 is currently conducting transactions at Location A.

At step 806, server computer 402 may determine the location of stationary merchant. For example, location module 406 may access database 410 to determine the locations of stationary merchants enrolled in the location notification service. The locations of stationary merchants, as stored in database 410, may be received in a number of different ways according to various embodiments of the invention. For example, in some embodiments, stationary merchants may provide their location in the form of a street address during the enrollment process. At step 806, location module 406 may also determine whether the distance between the location of the mobile merchant and the location of the stationary merchant is within a threshold value. For example, during the enrollment process, the stationary merchants and/or mobile merchant may provide a threshold distance value (e.g., 100 feet, 100 yards, 0.25 miles, etc.). Threshold distance values may also be determined by recommended values, best practice values, default values, etc. If location module 406 determines that the distance between the stationary merchant and the mobile merchant exceeds the threshold value, in some embodiments, a notification may not be transmitted, and the authorization request message may simply be forwarded to issuer computer 114 for authorization of the transaction. If, however, the distance between the mobile merchant and the stationary merchant is within the threshold value, method 800 may proceed to step 808. Referring back to the above illustration, location module 406 may access database 410 and determine that stationary merchant 204 is located 50 yards away from Location A where mobile merchant 108 is currently conducting transactions, and that the threshold distance value established by stationary merchant 204 during the enrollment process is 100 yards. Since the distance between stationary merchant 204 and Location A is within the threshold distance value, method 800 may proceed to step 808.

It should be noted that in some embodiments of the invention, a mobile merchant category or type may also be considered when determining whether to transmit a location notification to the stationary merchant. For example, during enrollment, the consumer may establish that they desire to receive location notifications only for mobile merchants that sell food, beverages, etc. Thus, before proceeding to step 808, location module 406 may access database 410 to further confirm that the mobile merchant is of a particular category or type for which the stationary merchant desires to receive location notifications.

At step 808, server computer 402 may generate a notification including the location of the mobile merchant. For example, at step 808, location module 406 may transmit the location of the mobile merchant, an identifier of the mobile merchant, and other information to notification module 408. In some embodiments, if the location of the mobile merchant is received as geographic coordinates, location module 406 may first convert the location into a format more convenient for the consumer such as an address, intersection, landmark, monument, etc., and transmit the reformatted location information to notification module 408. Location module 406 may also provide notification module 408 with various stationary merchant preferences stored in database 410 such as a client device address (e.g., phone number, e-mail address, IP address, etc.), a notification format type (e.g., e-mail, SMS, etc.), and any other suitable consumer preferences. Notification module 408 may then generate a notification including the location of the mobile merchant. Referring back to the above illustration, at step 808, location module 406 may determine that stationary merchant 204 prefers to receive notifications in the form of an e-mail message. Upon transmitting this preference to notification module 408 along with the location of mobile merchant 108, notification module 408 may generate an e-mail message indicating that mobile merchant 108 is currently conducting transactions at Location A.

At step 810, server computer 402 may transmit the notification including the location of the mobile merchant to a client device associated with the stationary merchant. According to embodiments of the invention, the notification can be transmitted in any suitable electronic form such as an e-mail, SMS message, instant message, page, telephone call, and the like. Referring back to the above illustration, at step 810, notification module 408 may transmit the notification to client device 202 as an e-mail message, the notification informing stationary merchant 204 that mobile merchant 108 is currently conducting transaction at Location A.

There may also be situations where one mobile merchant may want to be notified of another mobile merchant's location. For example, a mobile merchant that sells one type of product (e.g., food) and a mobile merchant that sells a complimentary type of product (e.g., beverages), may want location notifications so that the mobile merchants can sell their complementary products at the same location.

Figure 9:
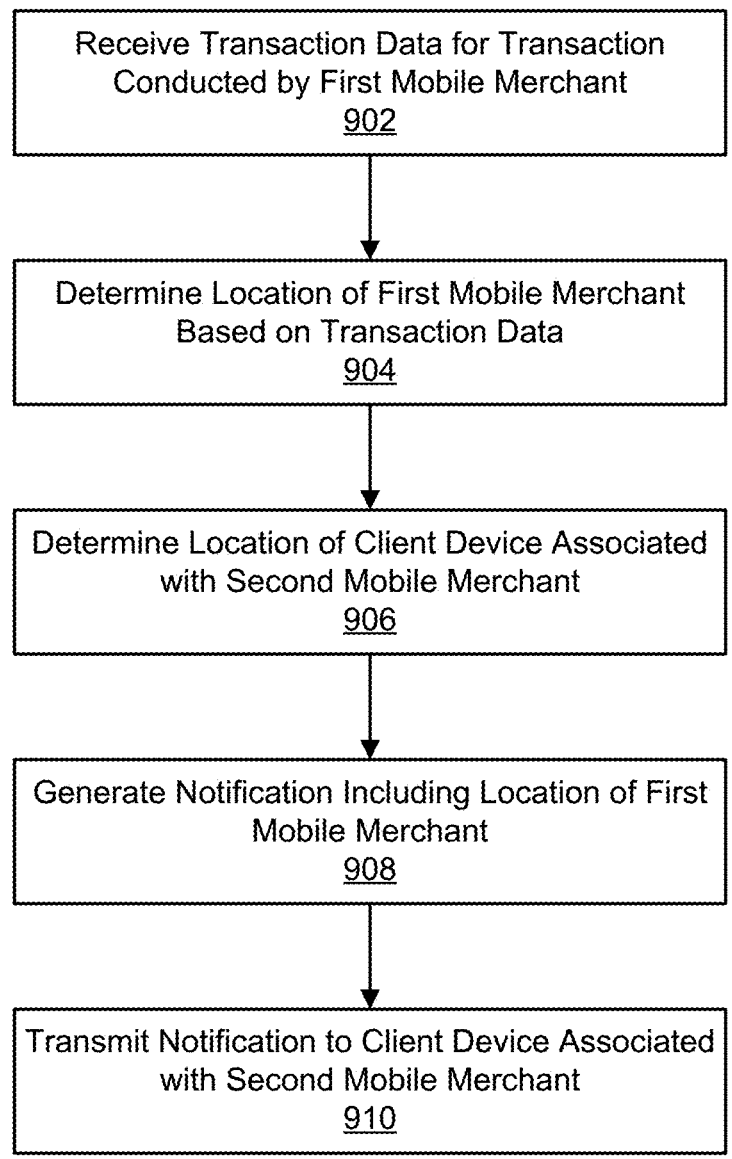
FIG. 9 illustrates a flow diagram showing a method for determining a location of a first mobile merchant, and sending a notification including the location of the first mobile merchant to a client device associated with a second mobile merchant according to an embodiment of the invention.

FIG. 9 illustrates a flow diagram showing a method 900 for determining a location of a first mobile merchant, and sending a notification including the location of the first mobile merchant to a client device associated with a second mobile merchant according to an embodiment of the invention.

In FIG. 9, at step 902, method 900 may begin by server computer 402 receiving transaction data for a transaction conducted by a first mobile merchant. As described above, in embodiments of the invention, the transaction data may be included as part of an authorization request message for the transaction. To illustrate, referring back to FIG. 2, consumer 102 may initiate the transaction with mobile merchant 108 by swiping or scanning portable consumer device 104 at mobile access device 106. If, for example, mobile merchant 108 is located at Location A, mobile access device 106 can generate the authorization request message to include geographic coordinates for Location A. Mobile access device 106 may then transmit the authorization request message to acquirer computer 110, which may forward the message to server computer 402 of payment processing network 112.

In embodiments of the invention, at step 902, server computer 402 may confirm that the first mobile merchant is enrolled in a location notification service. For example, the transaction data included in the authorization request message may further include an identifier of the first mobile merchant. Upon receipt of the authorization request message, authorization module 404 may access database 410 to determine whether the first mobile merchant is enrolled. If it is determined that the first mobile merchant is not enrolled, authorization module 404 may simply forward the authorization request message to issuer computer 114 for authorization of the transaction. If, however, the first mobile merchant is enrolled in the location notification service, method 900 may proceed to step 904.

At step 904, server computer 402 may determine the location of the first mobile merchant based on the received transaction data. For example, if the transaction data is received as part of an authorization request message, authorization module 404 of server computer 402 may analyze the authorization request message to determine the location of the first mobile merchant as included in the transaction data. Referring back to the above illustration, authorization module 404 may analyze the geographic coordinates included in the authorization request message generated and transmitted by access device 106, and determine that mobile merchant 108 is currently conducting transactions at Location A.

At step 906, server computer 402 may determine the location of a client device associated with a second mobile merchant. For example, location module 406 may access database 410 to determine the location of a client device associated with a second mobile merchant that is enrolled in the location notification service. In some embodiments, location module 406 may identify the second mobile merchant as being part of a social network including the first mobile merchant. The location of a client device associated with the second mobile merchant, as stored in database 410, may be received in a number of different ways according to various embodiments of the invention. In some embodiments, the client device associated with the second mobile merchant may transmit or "push" its location to server computer 402. In some embodiments, server computer may 402 transmit a request to the client device for the device's location, i.e. by a "pull" process. In response, the client device may transmit its location to server computer 402. In either case, the location may be transmitted by the client device associated with the second mobile merchant periodically, based on a schedule established by the second mobile merchant, in response to the second mobile merchant interacting with an application running on the client device, or by any other suitable mechanism according to embodiments of the invention.

At step 906, location module 406 may also determine whether the distance between the location of the first mobile merchant and the location of the second mobile merchant is within a threshold value. For example, during the enrollment process, the first or second mobile merchant may provide a threshold distance value (e.g., 250 yards, 0.25 miles, 0.5 miles, 1 mile, etc.). Threshold distance values may also be determined by recommended values, best practice values, default values, etc. If location module 406 determines that the distance between the first and second mobile merchant exceeds the threshold value, in some embodiments, a notification may not be transmitted, and the authorization request message may simply be forwarded to issuer computer 114 for authorization of the transaction. If, however, the distance between the first and second mobile merchants is within the threshold value, method 900 may proceed to step 908. Referring back to the above illustration, location module 406 may access database 410 and determine that client device 206 (and hence mobile merchant 208) is located 0.7 miles away from Location A where mobile merchant 108 is currently conducting transactions, and that the threshold distance value established by mobile merchant 208 during the enrollment process is 1 mile. Since the distance between mobile merchant 208 and Location A is within the threshold distance value, method 900 may proceed to step 908.

As explained above, mobile merchants may want notifications transmitted to other mobile merchants that sell complimentary products. In embodiments of the invention, a mobile merchant category or type for the second mobile merchant may also be considered when determining whether to transmit a location notification to the stationary merchant. For example, during enrollment, the second mobile merchant may establish that they desire to receive location notifications only for mobile merchants that sell food, beverages, etc. Thus, before proceeding to step 908, location module 406 may access database 410 to further confirm that the second mobile merchant is of a particular category or type desired by the first mobile merchant to ensure that the first and second mobile merchants sell complementary (and not competing) products.

At step 908, server computer 402 may generate a notification including the location of the first mobile merchant. For example, at step 908, location module 406 may transmit the location of the first mobile merchant, an identifier of the first mobile merchant, and other information to notification module 408. In some embodiments, if the location of the first mobile merchant is received as geographic coordinates, location module 406 may first convert the location into a format more convenient for the consumer such as an address, intersection, landmark, monument, etc., and transmit the reformatted location information to notification module 408. Location module 406 may also provide notification module 408 with various preferences for the second mobile merchant stored in database 410 such as a client device address (e.g., phone number, e-mail address, IP address, etc.), a notification format type (e.g., e-mail, SMS, etc.), and any other suitable consumer preferences. Notification module 408 may then generate a notification including the location of the first mobile merchant. Referring back to the above illustration, at step 908, location module 406 may determine that mobile merchant 208 prefers to receive notifications in the form of an SMS message. Upon transmitting this preference to notification module 408 along with the location of mobile merchant 108, notification module 408 may generate an SMS message indicating that mobile merchant 108 is currently conducting transactions at Location A.

At step 910, server computer 402 may transmit the notification including the location of the first mobile merchant to a client device associated with the second mobile merchant. According to embodiments of the invention, the notification can be transmitted in any suitable electronic form such as an e-mail, SMS message, instant message, page, telephone call, and the like. Referring back to the above illustration, at step 910, notification module 408 may transmit the notification to client device 206 as an SMS text message, the notification informing mobile merchant 208 that mobile merchant 108 is currently conducting transaction at Location A. In response, mobile merchant 208 may relocate to Location A to sell its complimentary products in collaboration with mobile merchant 108.

In some circumstances, mobile merchants may also want to provide a consolidated loyalty program. For example, one mobile merchant may be at Location A on Mondays and Wednesdays, while another mobile merchant may be at Location A on Tuesdays, Thursdays, and Fridays. The mobile merchants may collaborate to provide a single coupon that can be applied to transactions at either mobile merchant. Thus, in embodiments of the invention, consolidated coupon data can be transmitted to a consumer as part of a notification including a mobile merchant's location, the consolidated coupon data relating to a discount or other benefit that can be redeemed at either mobile merchant. Similarly, a consolidated coupon may be redeemable at both a mobile merchant and one or more stationary merchants.

Figure 10A:
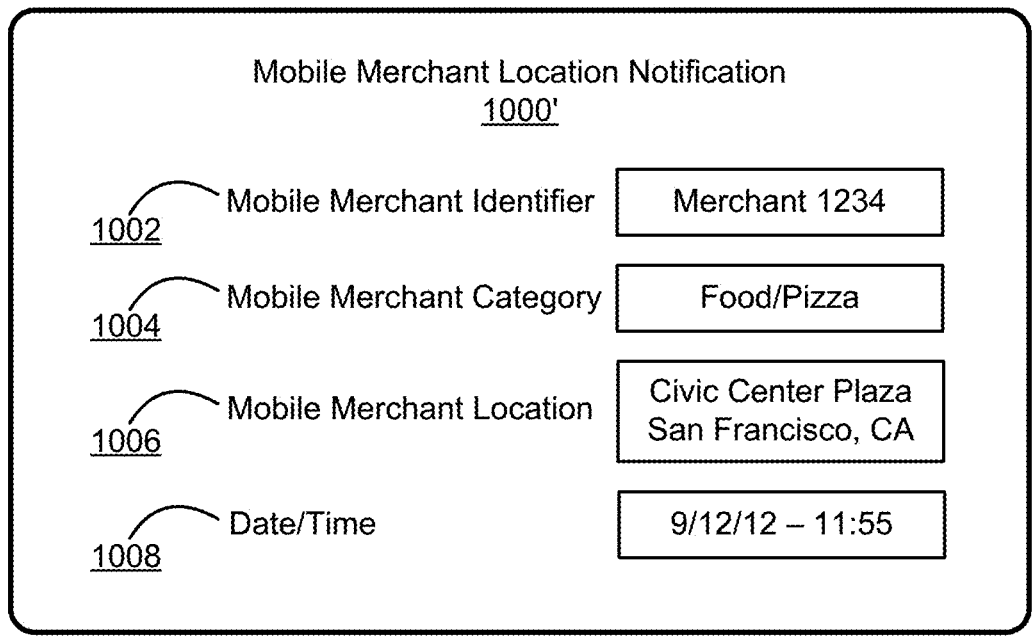
FIGS. 10A-10B show exemplary notifications according to embodiments of the invention.
Figure 10B:
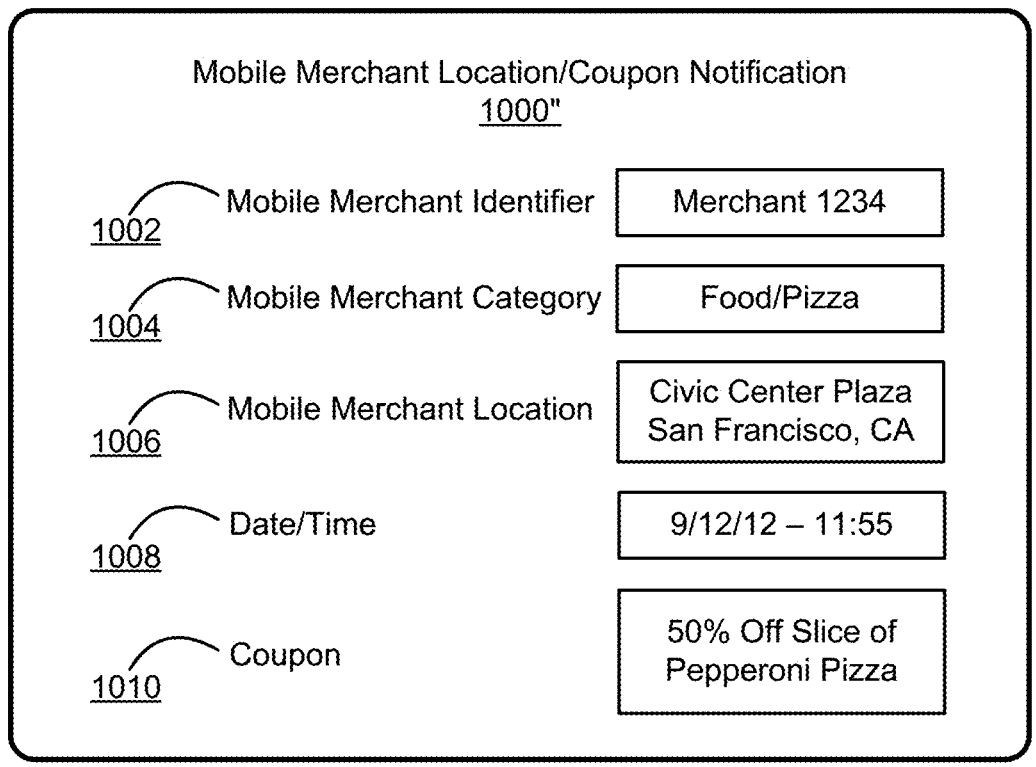

FIGS. 10A-10B show exemplary notifications according to embodiments of the invention. As explained above, notifications can be transmitted in any suitable electronic form such as an e-mail, SMS message, instant message, and the like.

As shown in FIG. 10A, a mobile merchant location notification 1000' may include a number of different fields according to embodiments of the invention. Such fields may include, for example, a mobile merchant identifier 1002 (e.g., mobile merchant name, MW, DBA, or the like), a mobile merchant category 1004 (e.g., food, dessert, beverage, souvenirs, specific goods or services for sale, or the like), a mobile merchant location 1006 (e.g., an address, intersection, landmark, monument, geographic coordinates, or the like), a date and time 1008 (e.g., the date and time the notification was generated, the date and time of the most recent transaction conducted by the mobile merchant, etc.), and any other suitable field.

As shown in FIG. 10B, a mobile merchant location/coupon notification 1000" may include fields 1002-1006 in addition to a coupon field 1010. In embodiments of the invention, coupon field 1010 may include coupon data identifying a discount or other benefit that may be applied to a transaction at the mobile merchant. For example, the coupon data may include a QR code or bar code that can be scanned at the mobile merchant, an image that can be displayed to the mobile merchant, or the like.

Embodiments of the invention provide a number of advantages. As described above, mobile merchants often "set up shop" at different locations on a day-to-day basis. Consequently, awareness by potential customers of a merchant's location can be an important factor in driving sales. By providing a mechanism for notifying consumers of a mobile merchant's location in real-time, many consumers may make purchases at the mobile merchant that would have otherwise been unaware of the merchant's location, thereby increasing sales revenue for the mobile merchant. By enabling merchants to further provide dynamic and instantaneous coupons, sales revenue may be further increased, and in the case of perishable goods, such coupons may reduce the amount of unsold goods that must be discarded at the end of the day. Moreover, by providing notifications to stationary merchants that a mobile merchant is conducting transactions nearby, the stationary merchant can take remedial measures to prevent losing sales to the mobile merchant. By providing notifications of one mobile merchant's location to another mobile merchant, two mobile merchants that sell complimentary products may collaborate by selling their products at the same location. Further, by utilizing an existing payment processing network to facilitate the transmission of location notifications to consumers, stationary merchants, and other mobile merchants, substantial changes to existing payment processing infrastructure may not be required according to various embodiments of the invention, and thus both mobile and stationary merchants may be provided with a convenient and efficient way to increase sales revenue without incurring the costs associated with hardware, software, and other payment processing infrastructure changes.

III. Exemplary Portable Consumer Devices and Computer Apparatuses

Figure 11A:
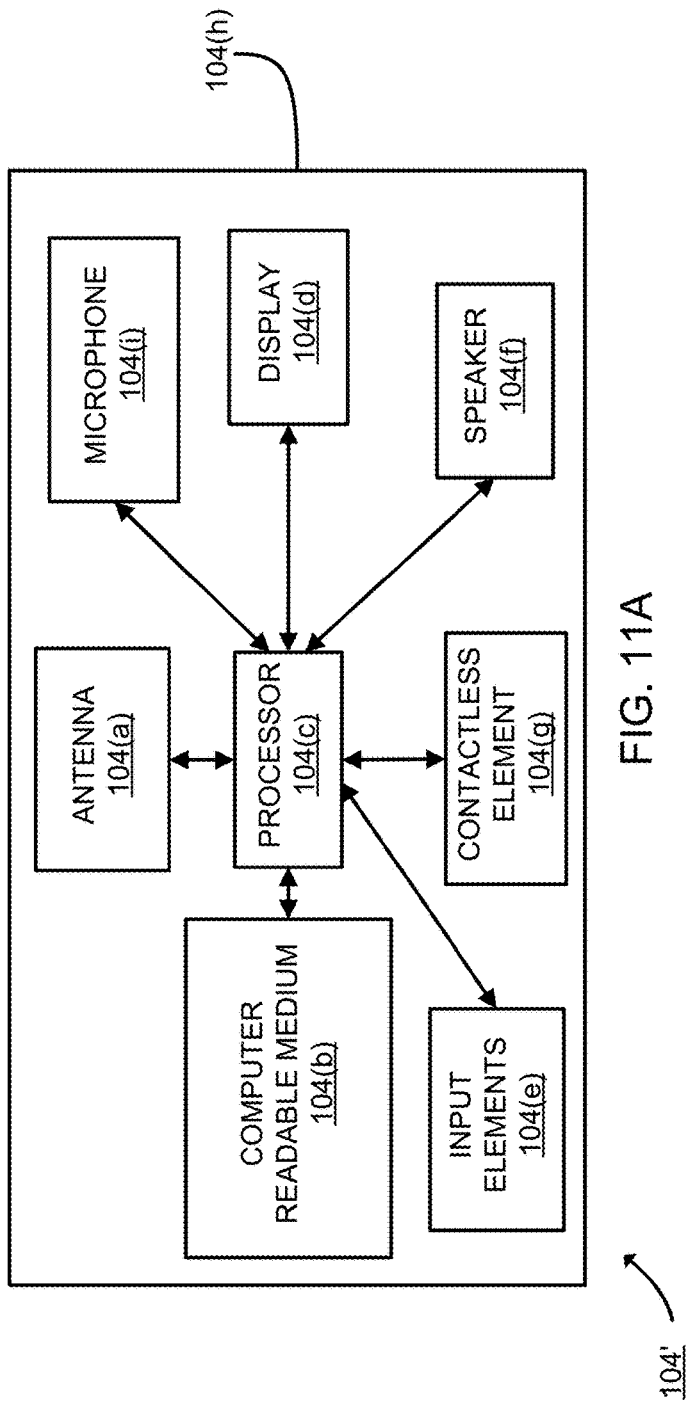
FIGS. 11A-11B show block diagrams of exemplary portable consumer devices according to embodiments of the invention.
Figure 11B:
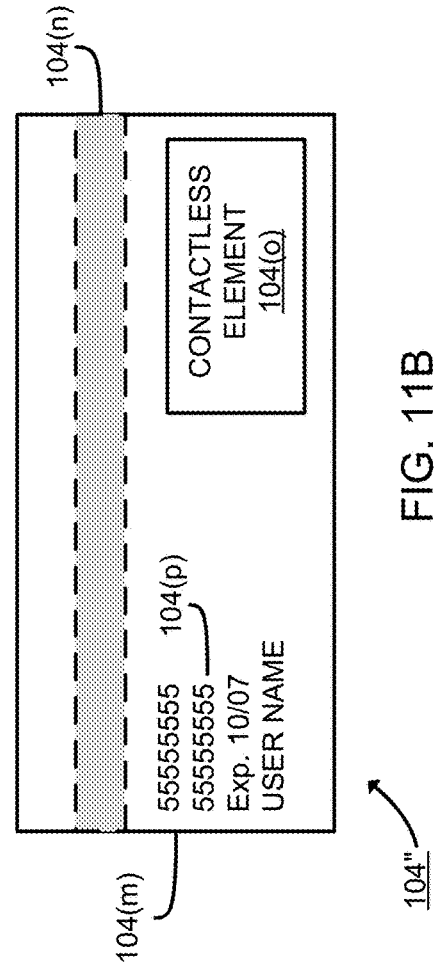

FIG. 11A-11B shows show block diagrams of exemplary portable consumer devices according to embodiments of the invention.

FIG. 11A shows a block diagram of a phone 104' that can be used in embodiments of the invention. The phone 104' can be both a notification device that can receive alert messages, as well as a portable device that can be used to make payments. The exemplary phone 104' may comprise a computer readable medium 104(*b*) and a body 104(*h*) as shown in FIG. 11A. The computer readable medium 104(*b*) may be in the form of (or may be included in) a memory that stores transaction data (e.g., issuer account numbers, loyalty provider account numbers, etc.) and may be in any suitable form including a magnetic stripe, a memory chip, etc. The memory may store information such as financial information, transit information (e.g., as in a subway or train pass), access information (e.g., as in access badges), etc. Financial information may include information such as bank account information, loyalty account information (e.g., a loyalty account number), an issuing bank identification number (BIN), credit or debit card number information, account balance information, an expiration date, consumer information such as the account holder's name, date of birth, etc. Any of this information may be transmitted by the phone 104'.

In some embodiments, information in the memory may also be in the form of data tracks that are traditionally associated with credit cards. Such tracks may include Track 1 and Track 2. Track 1 ("International Air Transport Association") may store more information than Track 2, and may contain the cardholder's name as well as account number and other discretionary data. This track is sometimes used by the airlines when securing reservations with a credit card. Track 2 ("American Banking Association") is currently most commonly used. This is the track that is read by ATMs and credit card checkers. The ABA (American Banking Association) designed the specifications of this track and all world banks abide by it. It contains the cardholder's account, encrypted PIN, plus other discretionary data.

The phone 104' may further include a contactless element 104(*g*), which may be implemented in the form of a semiconductor chip (or other data storage element) with an associated wireless transfer (e.g., data transmission) element, such as an antenna. The contactless element 104(*g*) may be associated with (e.g., embedded within) the phone 104' and data or control instructions transmitted via a cellular network may be applied to the contactless element 104(*g*) by means of a contactless element interface (not shown). The contactless element interface may function to permit the exchange of data and/or control instructions between the mobile device circuitry (and hence the cellular network) and the optional contactless element 104(g).

The contactless element 104(g) may be capable of transferring and receiving data using a near field communications ("NFC") capability (or near field communications medium) in accordance with a standardized protocol or data transfer mechanism (e.g., ISO 14443/NFC). Near field communications capability is a short-range communications capability, such as RFID, Bluetooth™, infra-red, or other data transfer capability that can be used to exchange data between the phone 104' and an interrogation device. Thus, the phone 104' may be capable of communicating and transferring data and/or control instructions via both a cellular network and near field communications capability.

The phone 104' may also include a processor 104(c) (e.g., a microprocessor) for processing the functions of the phone 104' and a display 104(d) to allow a consumer to see the phone numbers and other information and messages. The phone 104' may further include input elements 104(e) to allow a user to input information into the device, a speaker 104(f) to allow the user to hear voice communication, music, etc., and a microphone 104(i) to allow the user to transmit her voice through the phone 104'. The phone 104' may also include an antenna 104(a) for wireless data transfer (e.g., data transmission).

If the portable consumer device is in the form of a debit, credit, or smartcard, the portable consumer device may also optionally have features such as magnetic strips. Such devices can operate in either a contact or contactless mode.

An example of a portable consumer device 104" in the form of a card is shown in FIG. 11B. FIG. 11B shows a plastic substrate 104(m). A contactless element 104(o) for interfacing with an access device may be present on or embedded within the plastic substrate 104(m). Consumer information 104(p) such as an account number, expiration date, and user name may be printed or embossed on the card. Also, a magnetic stripe 104(n) may also be on the plastic substrate 104(m). The portable consumer device 104" may also comprise a microprocessor and/or memory chips with user data stored in them.

As shown in FIG. 11B, the portable consumer device 104" may include both a magnetic stripe 104(n) and a contactless element 104(o). In other embodiments, both the magnetic stripe 104(n) and the contactless element 104(o) may be in the portable consumer device 104". In other embodiments, either the magnetic stripe 104(n) or the contactless element 104(o) may be present in the portable consumer device 104".

Figure 12:
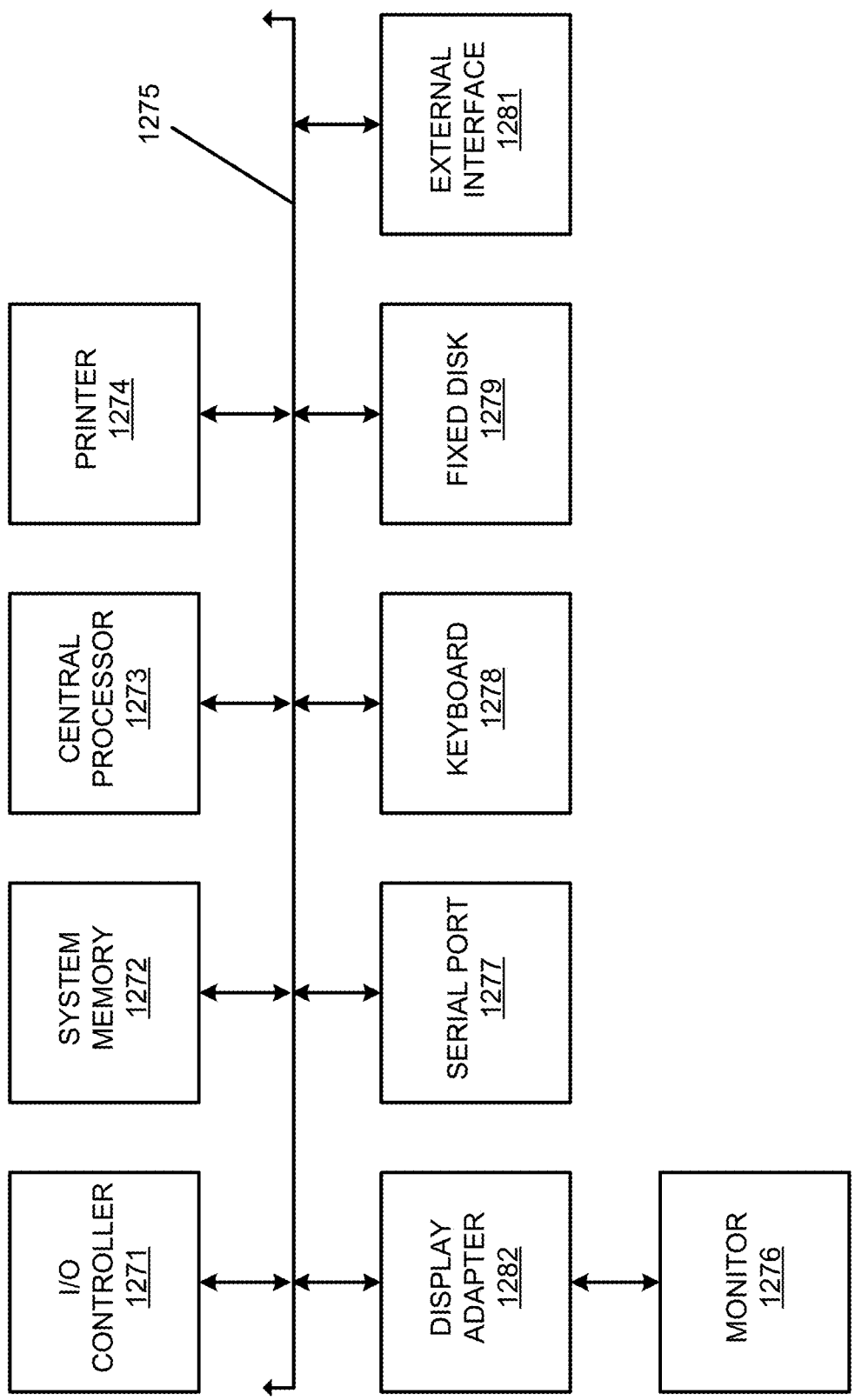
FIG. 12 shows a block diagram of a computer apparatus according to an embodiment of the invention.

FIG. 12 shows a block diagram of a computer apparatus according to an embodiment of the invention.

The various participants and elements may operate one or more computer apparatuses (e.g., server computers) to facilitate the functions described herein, and any of the elements in the figures may use any suitable number of subsystems to facilitate the functions described herein. Examples of such subsystems or components are shown in FIG. 12. The subsystems shown in FIG. 12 are interconnected via a system bus 1275. Additional subsystems such as a printer 1274, keyboard 1278, fixed disk 1279 (or other memory comprising computer readable media), monitor 1276, which is coupled to display adapter 1282, and others are shown. Peripherals and input/output (I/O) devices, which couple to I/O controller 1271, can be connected to the computer system by any number of means known in the art, such as serial port 1277. For example, serial port 1277 or external interface 1281 can be used to connect the computer apparatus to a wide area network such as the Internet, a mouse input device, or a scanner. The interconnection via system bus 1275 may allow the central processor 1273 to communicate with each subsystem and to control the execution of instructions from the system memory 1272 or the fixed disk 1279, as well as the exchange of information between subsystems. The system memory 1272 and/or the fixed disk 1279 may embody a computer readable medium.

Further, while the present invention has been described using a particular combination of hardware and software in the form of control logic and programming code and instructions, it should be recognized that other combinations of hardware and software are also within the scope of the present invention. The present invention may be implemented only in hardware, or only in software, or using combinations thereof.

The software components or functions described in this application may be implemented as software code to be executed by one or more processors using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may also reside on or within a single computational apparatus, and may be present on or within different computational apparatuses within a system or network.

The present invention can be implemented in the form of control logic in software or hardware or a combination of both. The control logic may be stored in an information storage medium as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited in this patent are hereby incorporated by reference for all purposes.

One or more features from any embodiment may be combined with one or more features of any other embodiment without departing from the scope of the disclosure.

In embodiments, any of the entities described herein may be embodied by a computer that performs any or all of the functions and steps disclosed.

Any recitation of "a", "an" or "the" is intended to mean "one or more" unless specifically indicated to the contrary.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A system comprising:
one or more processors;
a location module configured to determine a distance between a merchant access device and a client device, wherein the location module is further configured to determine whether the distance is within a threshold value, the threshold value being specified by a merchant associated with the merchant access device; and a notification module configured to produce image data for display if the location module determines that the distance is within the threshold value, wherein the image data for display is used in a transaction between the merchant access device and the client device.

2. The system of claim 1, wherein the image data includes image data for a bar code.

3. The system of claim 1, wherein the image data includes image data for a QR code.

4. The system of claim 1, wherein the client device is a mobile phone.

5. The system of claim 1, wherein the image data is displayed on a display screen.

6. The system of claim 1, wherein the merchant access device is a point of sale device.

7. The system of claim 1, wherein the threshold value is 100 meters or less.

8. The system of claim 1, wherein the merchant access device is operated by a mobile merchant.

9. The system of claim 1, wherein the notification module is configured to transmit the image data in a notification to the client device.

10. The system of claim 1, wherein the merchant access device is capable of communicating with a payment processing network.

11. A method comprising:

determining, by a location module, a distance between a merchant access device and a client device, wherein the location module is further configured to determine whether the distance is within a threshold value, the threshold value being specified by a merchant associated with the merchant access device; and producing, by a notification module, image data for display if the location module determines that the distance is within the threshold value, wherein the image data for display is used in a transaction between the merchant access device and the client device.

12. The method of claim 11, wherein the image data includes image data for a bar code.

13. The method of claim 11, wherein the image data includes image data for a QR code.

14. The method of claim 11, wherein the client device is a mobile phone.

15. The method of claim 11, further comprising:

displaying an image corresponding to the image data on the client device.

16. The method of claim 11, wherein the merchant access device is a point of sale device.

17. The method of claim 11, wherein the threshold value is 100 meters or less.

18. The method of claim 11, wherein the merchant access device is operated by a mobile merchant.

19. The method of claim 11, wherein the notification module is configured to transmit the image data in a notification to the client device.

20. The method of claim 11, wherein the merchant access device is capable of communicating with a payment processing network.

21. The method of claim 11, further comprising:

providing, by the client device, the image data to the merchant access device in the transaction, wherein the image data is a QR code.

* * * * *